United States Patent [19]
Endo et al.

[11] Patent Number: 5,437,816
[45] Date of Patent: * Aug. 1, 1995

[54] HIGH POLYMER AND FERROELECTRIC LIQUID CRYSTAL COMPOSITION UTILIZING SAME

[75] Inventors: Hiroyuki Endo; Fumio Moriwaki; Satoshi Hachiya, all of Sodegaura, Japan

[73] Assignee: Idemitsu Kosan Co., Ltd., Tokyo, Japan

[ * ] Notice: The portion of the term of this patent subsequent to May 31, 2011 has been disclaimed.

[21] Appl. No.: 977,213

[22] Filed: Nov. 16, 1992

[30] Foreign Application Priority Data

Nov. 14, 1991 [JP]  Japan .................... 3-325074

[51] Int. Cl.$^6$ .................... C09K 19/12; C09K 19/52; C07F 7/04
[52] U.S. Cl. .................... 252/299.65; 252/299.01; 556/436; 556/438
[58] Field of Search .................... 252/299.01, 299.66, 252/299.65; 556/436, 438

[56] References Cited

U.S. PATENT DOCUMENTS

| | | | |
|---|---|---|---|
| 5,138,010 | 8/1992 | Keller et al. | 528/26 |
| 5,190,689 | 3/1993 | Finkelmann et al. | 252/299.01 |
| 5,211,877 | 5/1993 | Andrejewski et al. | 252/299.01 |
| 5,316,693 | 5/1994 | Yuasa et al. | 252/299.01 |

FOREIGN PATENT DOCUMENTS

| | | |
|---|---|---|
| 0493601 | 7/1992 | European Pat. Off. . |
| 0509465 | 10/1992 | European Pat. Off. . |
| 9201764 | 2/1992 | WIPO . |

*Primary Examiner*—Cynthia Harris
*Attorney, Agent, or Firm*—Antonelli, Terry, Stout & Kraus

[57] ABSTRACT

A high polymer comprising a recurring unit represented by the formula:

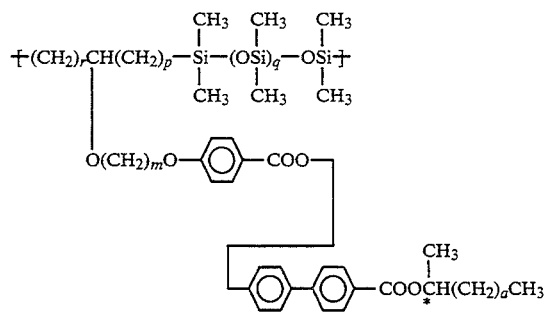

wherein r and p each represent an integer of 2 to 5, q represents a number of 4 to 20, m represents an integer of 8 to 12, a represents an integer of 1 to 8, and * represents an asymmetric carbon, and a ferroelectric liquid crystal composition comprising the high polymer and a low molecular weight smectic liquid crystal are disclosed.

21 Claims, 16 Drawing Sheets

HIGH POLYMER AND FERROELECTRIC LIQUID CRYSTAL COMPOSITION UTILIZING SAME

BACKGROUND OF THE INVENTION (a) Field of the Invention

The present invention relates to novel high polymers and to ferroelectric liquid crystal compositions utilizing the same. More particularly, the present invention relates to novel high polymers and ferroelectric liquid crystal compositions which are suitable materials for liquid crystal devices used in optoelectronics fields, for example, digital display devices of desk calculators, clocks and watches, dot-matrix display devices, electrooptic shutters, electrooptic diaphragms, optical modulators, optical-path transfer switches in optical communication systems, memories, liquid crystal printer heads and varifocal lenses.

(b) Description of the Related Art

Display devices utilizing low molecular weight liquid crystals have been used widely for digital display of desk calculators, clocks and watches, etc. In these fields of utilization, the conventional low molecular weight liquid crystals are generally supported between a couple of glass substrates spaced from each other in microns. However, such an adjustment of the space has been impracticable in the production of large picture planes or curved picture planes. A means which has been employed for solving the problem is the development of liquid crystal polymers or of liquid crystal compositions containing low molecular weight liquid crystals and high polymers.

For example, in Japanese Patent Application Kokai Koho (Laid-open) No. 63-284291 proposed are liquid crystal compositions comprising low molecular weight liquid crystals and polymer liquid crystals having asymmetric carbon atoms. However, the side chain polymer liquid crystals exemplified therein have aerylate main chains or siloxane main chains, which cannot provide sufficient spaces between side chains, and increasing their molecular weights makes it difficult to mix the low molecular weight liquid crystals in a sufficient quantity to attain a great increase in response speed. That is, the liquid crystal compositions have difficulty in uniting polymeric properties and high speed response.

As an attempt to unite polymeric properties and high speed response by mixing non-liquid-crystalline high polymers and low molecular weight liquid crystals, Japanese Patent Application Kokai Koho (Laid-open) No. 61-47427 discloses compositions which are endowed with self shape retention by blending amorphous polymers into low molecular weight liquid crystals. However, the compositions involve a problem in that after allowed to stand for a long time, they are apt to separate because of the liquid crystal regions dispersed in the matrix of the high polymers (resins). Further, the compositions are poor in contrast because of the island-dispersion of the low molecular weight liquid crystals, and such a dispersion system makes it difficult to control their orientation. In Japanese Patent Application Kokai Koho (Laid-open) Nos. 62-260859 and 62-260841 disclosed are ferroelectric composite films containing thermoplastic resins and low molecular weight liquid crystals which are compatible with each other. However, it is difficult to select the low molecular weight liquid crystals compatible with the thermoplastic resins, and it is also difficult to control the orientation of the films. Further, the low molecular weight liquid crystals are limited to ferroelectric liquid crystals. In Japanese Patent Application Kokai Koho (Laid-open) No. 1-198683 disclosed are compositions which comprise polymers containing proton donors (or proton acceptors) and low molecular weight liquid crystals containing proton acceptors (or proton donors). However, the compositions also involve a problem in that the structures of the polymers and the low molecular weight liquid crystals are limited to those having proton donors or proton acceptors.

SUMMARY OF THE INVENTION

An object of the present invention is to provide liquid crystal compositions which permit easy control of orientation, can form excellent alignment, exhibit ferroelectricity, are quick to respond to external factors, and are useful as materials of the display devices with large or curved picture planes.

Another object of the present invention is to provide novel high polymers, which are so compatible with low molecular weight liquid crystals as to prevent phase separation and are suitable materials of the liquid crystal compositions.

As the result of researches made by the inventors to solve the above-described problems, they found that the objective liquid crystal compositions are obtainable by using as a high polymer component a novel high polymer of a specific structure which provides a wide space between side chains. Based on the finding, they consequently completed the present invention.

That is, the present invention provides a novel high polymer comprising a recurring unit represented by the formula:

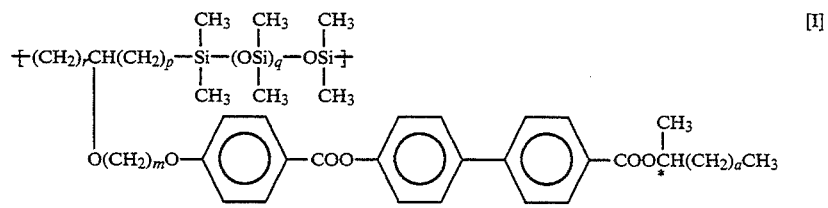

wherein
r and p each represent an integer of 2 to 5,
q represents a number of 4 to 20,
m represents an integer of 8 to 12,
a represents an integer of 1 to 8,
and * represents an asymmetric carbon.

The present invention further provides a ferroelectric liquid crystal composition comprising the novel high polymer and a low molecular weight liquid crystal. Because of the compatibility of the novel high polymer with the low molecular weight liquid crystal, the ferroelectric liquid crystal composition forms a uniform mixture, which permits easy and uniform orientation of the composition.

PREFERRED EMBODIMENTS OF THE INVENTION

Figure 1:
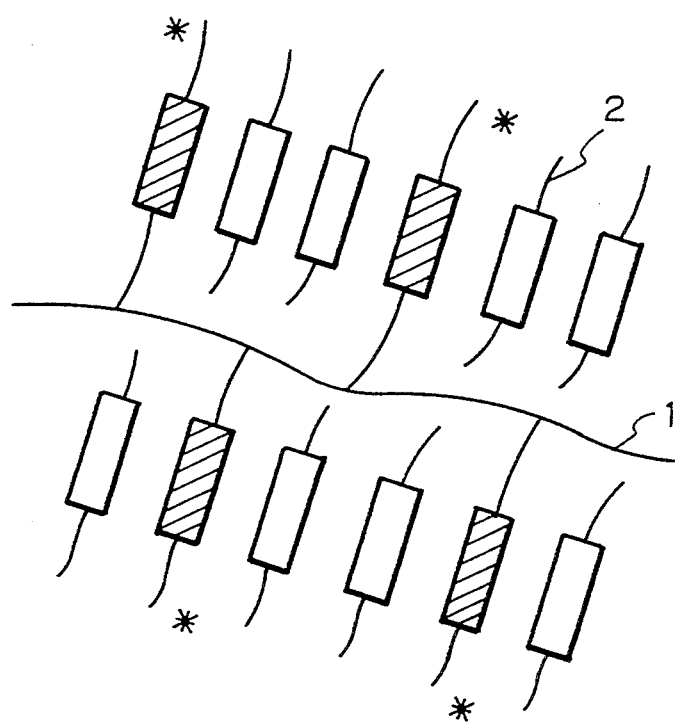
FIG. 1 is a schematic view illustrating the mixed state of the liquid crystal composition of the present invention.

The weight average molecular weight (Mw) of the high polymer of the present invention is preferably 1,000 to 1,000,000, more preferably 1,000 to 100,000. If the Mw is less than 1,000, the high polymer may become poor in moldability into film or coating, and an Mw of more than 1,000 may have undesirable effects, such as a decreased response speed.

The high polymer of the present invention may be prepared by carrying out hydrosilylation of a diene compound [II] represented by the formula:

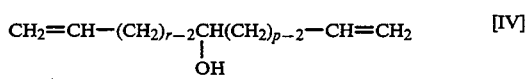
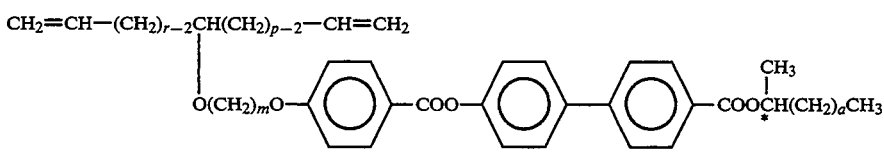

wherein r, p, m, a and * are as defined above, and a silicon compound [III] represented by the formula:

$$H{+}Si{-}(OSi)_q{-}OSi{+}H$$
(with CH$_3$ substituents as shown) [III]

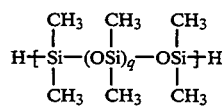

wherein q is as defined above, in a solvent in the presence of a catalyst.

The ratio of the diene compound [II] to the silicon compound [III] may be varied according to the desired polymerization degree of the objective high polymer. High polymers of higher polymerization degrees are obtainable by adjusting the molar ratio of [II]/[III] nearer 1, and those of lower polymerization degrees are obtainable by adjusting it to a value greater or lesser than 1.

Preferred examples of the solvent to be used for the hydrosilylation of the compounds [II] and [III] include inert aromatic hydrocarbons of a boiling point of 70° C. or higher, such as benzene, toluene and xylene, and inert ethers of a boiling point of 65° C. or higher, such as tetrahydrofuran and diisopropyl ether. Preferred examples of the catalyst include platinum catalysts, for example, hydrogen hexachloroplatinate, such as hydrogen hexachloroplatinate (IV) hexahydrate, and dicyclopentadienylplatinum chloride. The reaction is preferably carried out for 5 to 20 hours at 60° to 100° C. in an atmosphere of an inert gas.

The compound [II] to be used as a material of the high polymer may be prepared by, for example, the method described below.

An alcohol [IV] represented by the formula:

$$CH_2{=}CH{-}(CH_2)_{r-2}CH(CH_2)_{p-2}{-}CH{=}CH_2 \quad [IV]$$
$$\quad\quad\quad\quad\quad\quad | $$
$$\quad\quad\quad\quad\quad OH$$

wherein r and p are as defined above,
is etherified with a difunctional compound [V] represented by the formula:

$$X(CH_2)_mX \quad [V]$$

wherein m is an integer of 8 to 12, and X is —Br, —I or —OSO$_2$C$_6$H$_4$CH$_3$, in a solvent in the presence of a base. The reaction mixture obtained is purified and then etherified with methyl 4-hydroxybenzoate in a solvent in the presence of a base. After the reaction mixture obtained is purified, hydrolysis of the purified product is carried out in an alkaline aqueous solution or an alkaline water-alcohol solution mixture. The obtained reaction solution is poured into water, and the mixed liquid is acidified to obtain a product by ether extraction or filtration. The product is allowed to react with a reagent for forming acid halides, and the acid halide obtained is esterified in a solvent with a hydroxy compound [VI] represented by the formula:

$$HO-R^1 \quad [VI]$$

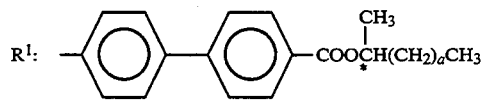

wherein a is as defined above.

For example, these reactions proceed as follows.

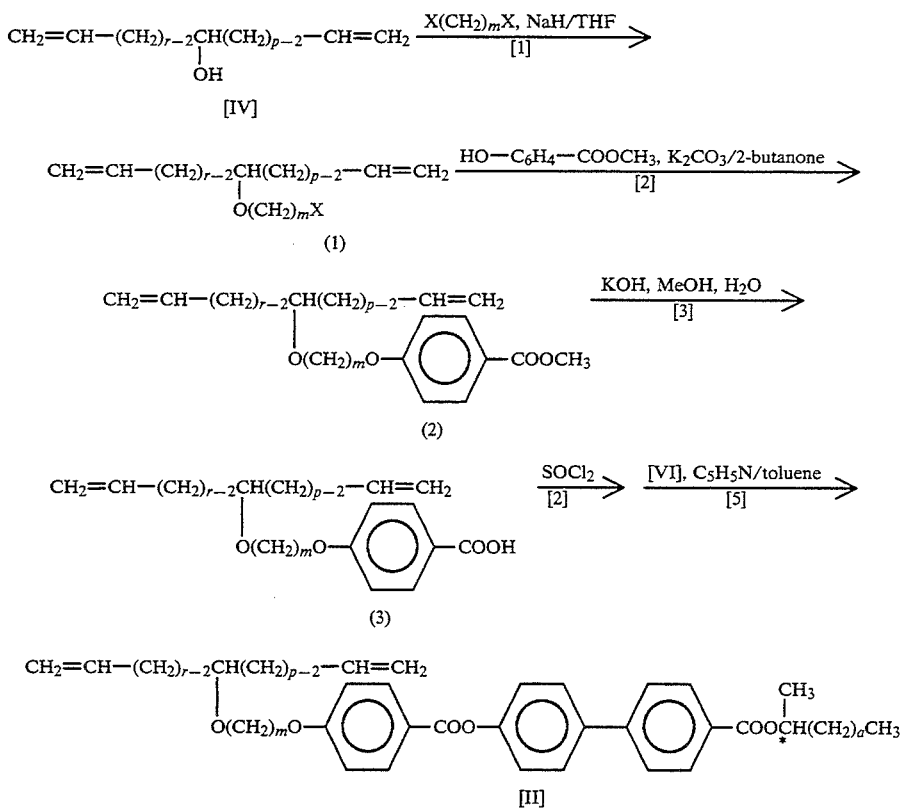

The etherification [1] of the alcohol [IV] and the difunctional compound [V] is carried out in a solvent in the presence of a base, to obtain the compound (1).

Typical examples of the alcohol [IV] include 1,4-pentadien-3-ol, 1,5-hexadien-3-ol, 1,6-heptadien-3-ol, 1,7-octadien-3-ol, 1,6-heptadien-4-ol, 1,8-nonadien-5-ol and 1,10-undecadien-6-ol.

Typical examples of the difunctional compound [V] include dibromooctane, diiodooctane, ditosyloctane, dibromononane, diiodononane, ditosylnonane, dibromodecane, diiododecane, ditosyldecane, dibromoundecane, diiodoundecane, ditosylundecane, dibromododecane, diiodododecane and ditosyldodecane.

Suitable examples of the solvent used for the etherification [1] include aprotic polar solvents, such as tetrahydrofuran and N,N-dimethylformamide, and suitable examples of the etherification catalyst include metal hydrides, such as sodium hydride, metal hydroxides, such as potassium hydroxide and sodium hydroxide, and basic compounds which ionize —OH.

The etherification [1] is carried out by introducing the alcohol [IV] into a mixture of the base and solvent to convert it to an alkoxide at room temperature (in the cases of compounds and reagents of low reactivity, at an elevated temperature), introducing thereto the difunctional compound [V], and then stirring the resulting mixture at 50° to 100° C.

Subsequently, the etherification [2] of the compound (1) with methyl 4-hydroxybenzoate is carried out in a solvent in the presence of a base, to obtain the compound (2). Suitable examples of the solvent used for the etherification [2] include ketone solvents, such as acetone and 2-butanone, and inert ethers, such as tetrahydrofuran and diethyl ether, and suitable examples of the etherification reagent include carbonates, such as potassium carbonate and sodium carbonate, and metal hydroxides, such as potassium hydroxide and sodium hydroxide.

The etherification [2] is carried out by introducing methyl 4-hydroxybenzoate, the compound (1) obtained from the etherification [1], the base and the solvent in a reactor, not in order, and stirring the mixture at 50° to 100° C.

The hydrolysis [3] of the obtained compound (2) is carried out in an alkaline aqueous solution or an alkaline water-alcohol solution mixture, with heating, according to demand, to obtain the compound (3). The halogenation [4] of the compound (3) is then carried out, and thus obtained acid halide is esterified [5] with the hydroxy compound [VI] in a solvent, such as toluene, in the presence of pyridine, etc., to obtain the objective diene compound [II].

In the hydrolysis [3], suitable examples of the base include metal hydroxides, such as potassium hydroxide and sodium hydroxide, and suitable examples of the alcohol include water-soluble lower alcohols, such as methanol and ethanol. Although the hydrolysis may be carried out by heating a mixture of only the three, the esterified compound, alkali catalysts and water, addition of alcohols increases the solubility of the ester compound, and the reaction proceeds more easily.

The halogenation [4] is carried out by using reagents usually used for the preparation of acyl halides, such as thionyl chloride, phosphorus oxychloride and phosphorus pentachloride. Other agents, such as pyridine and triethylamine, may be added into the reaction system.

Suitable examples of the solvent used for the esterification [5] include inert ethers, such as tetrahydrofuran, and inert hydrocarbon, such as toluene and hexane.

The esterification [5] is carried out by introducing thus obtained acid chloride or a solution of the acid chloride dissolved in a solvent, into a solution containing acceptors of hydrogen halides, for example, pyridine and tertiary amines, such as triethylamine, followed by stirring. If the reaction exhibits low reactivity, the mixture may be heated to 30° to 80° C.

The compound [II] may be prepared by other methods, for example, by etherifying the alcohol [IV] with the difunctional compound [V] in a solvent in the presence of a base, purifying the reaction mixture, and etherifying the purified product with an hydroxy compound [VII] represented by the formula:

HO—R² [VII]

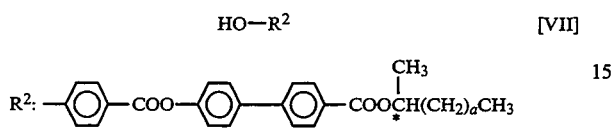

wherein a is as defined above,
in a solvent in the presence of a base. For example, these reactions proceeds as follows.

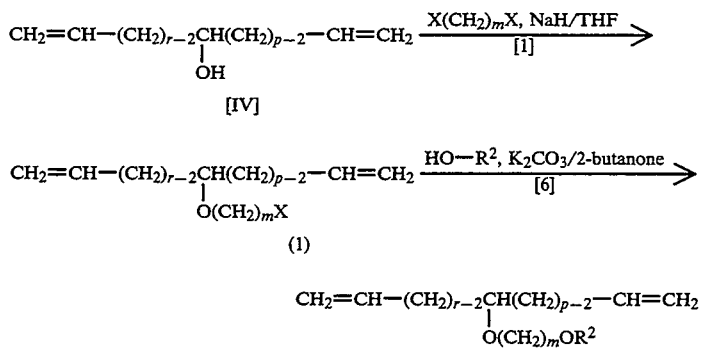

The etherification [1] for the production of the compound (1) is carried out in the same manner as above described. The solvent, the reagent and the reaction conditions employed in the etherification [6] are the same as those employed in etherification [2].

The optically active group in the hydroxy compounds [VI] and [VII] is introduced by using an optically active alcohol R³OH by utilizing the following reaction.

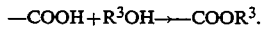

Optically active alcohols represented by R³OH include (+)-2-butanol, (−)-2-butanol, (+)-2-pentanol, (−)-2-pentanol, (+)-2-hexanol, (−)-2-hexanol, (+)-2-heptanol, (−)-2-heptanol, (+)-2-octanol, (−)-2-octanol, (+)-2-nonanol, (−)-2-nonanol, (+)-2-decanol, (−)-2-decanol, (+)-2-undecanol and (−)-2-undecanol.

The silicon compound [III] that is the other material of the high polymer of the present invention and has two Si—H bonds is an α,ω-hydrogen olygodimethylsiloxane of 6 or more silicon atoms. Since the polymerization degree (the value of q) of this compound is distributed, q represents an average value. Therefore, the value of q of the high polymer also is an average value.

The present invention further provides a ferroelectric liquid crystal composition comprising the high polymer and a low molecular weight smectic liquid crystal.

The ferroelectric liquid crystal composition of the present invention may be prepared by mixing the high polymer and the low molecular weight smectic liquid crystal.

The low molecular weight smectic liquid crystal to be used in the present invention is not particularly limited and may be at least one selected from known compounds. Some examples of the low molecular weight smectic liquid crystal include the followings:

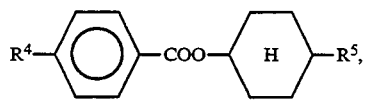

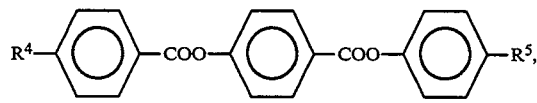

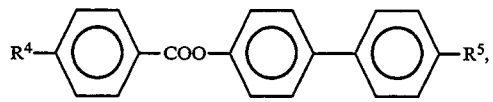

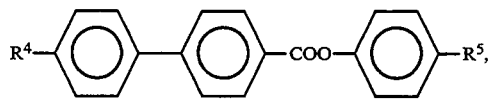

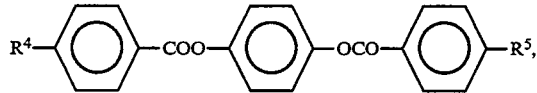

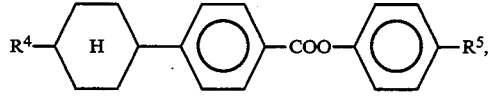

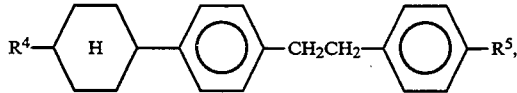

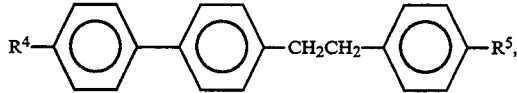

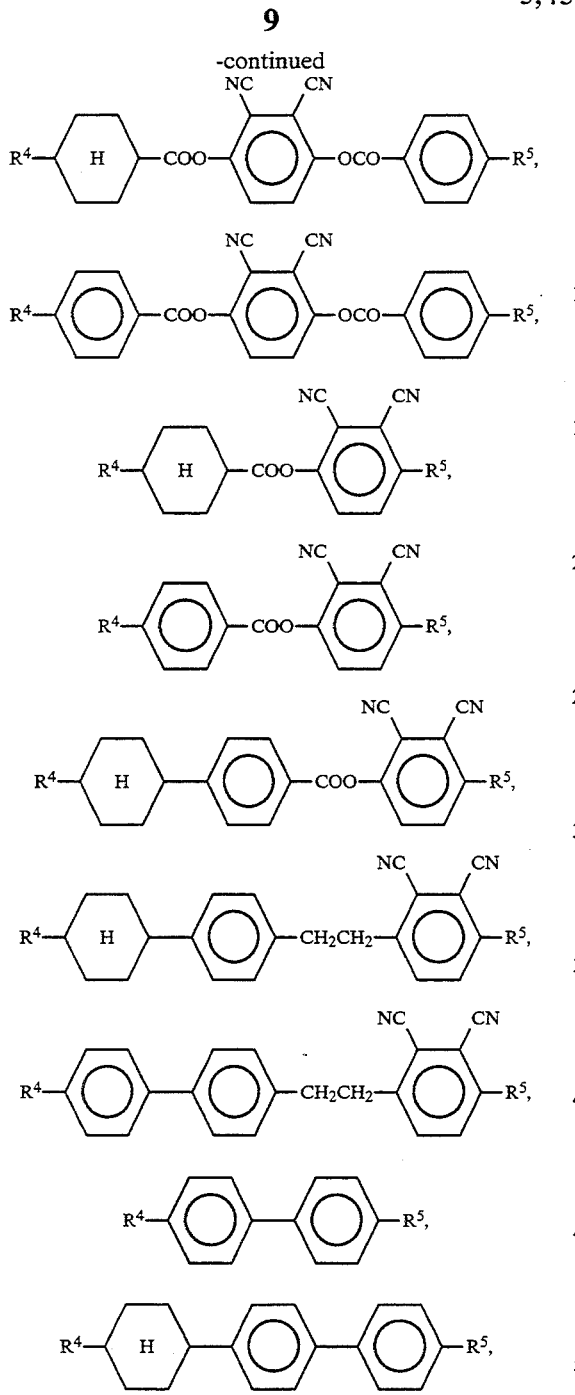

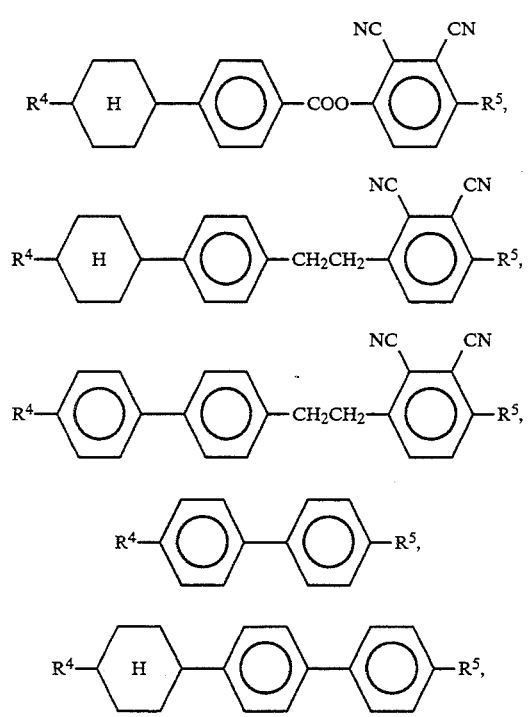

wherein, $R^4$ and $R^5$ each represent linear or branched alkyl, alkoxy or acyloxy of 1 to 12 carbon atoms, and are identical with or different from each other.

The compounds represented by the following formulas may as well be used as the low molecular weight smectic liquid crystal.

In the formula (I), $R^6$ represents an alkyl of 7 to 12 carbon atoms, an alkoxy of 6 to 11 carbon atoms or an acyloxy of 6 to 12 carbon atoms, and $R^7$ represents an alkyl of 7 to 12 carbon atoms or an alkoxy of 6 to 11 carbon atoms. In the formula (II), $R^8$ and $R^9$ each represent an alkyl or alkoxy of 4 to 14 carbon atoms and are identical with or different from each other. In the formula (III), $R^{10}$ represents an alkyl of 4 to 14 carbon atoms, and $R^{11}$ represents an alkyl of 5 to 14 carbon atoms or an alkoxy of 4 to 14 carbon atoms.

The above described diene compound [II] may also be used as the low molecular weight smectic liquid crystal.

Some examples of these low molecular weight smectic liquid crystals include the followings:

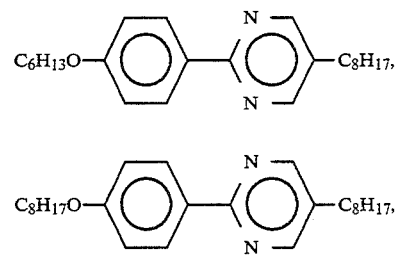

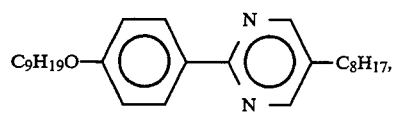
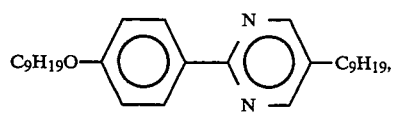
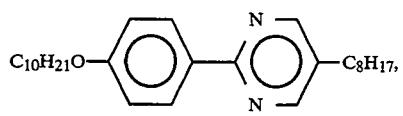
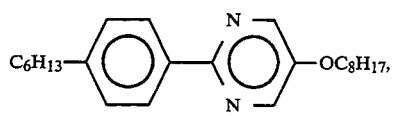
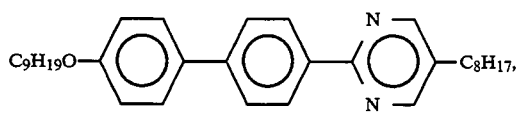
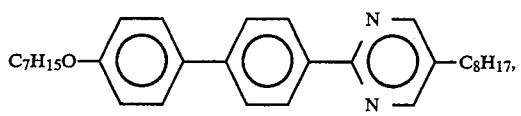
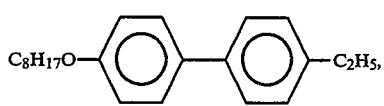
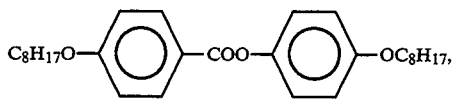
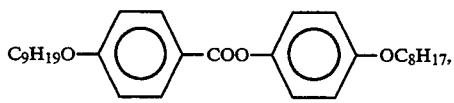
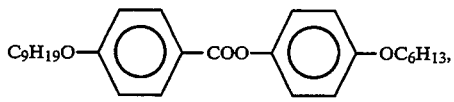
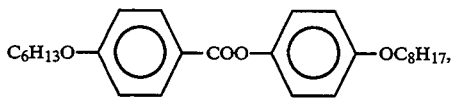
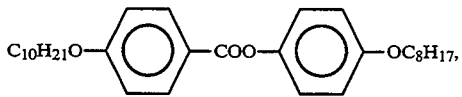
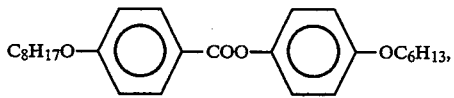

-continued

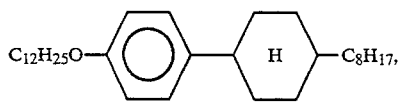

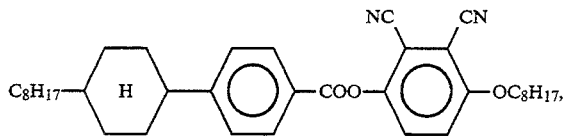

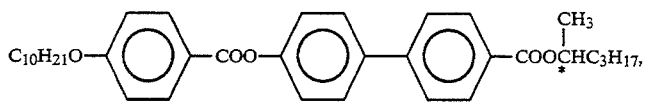

H₂C=CHCHCH₂CH=CH₂

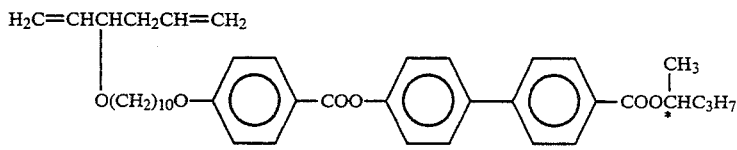

and

H₂C=CHCH₂CHCH₂CH=CH₂

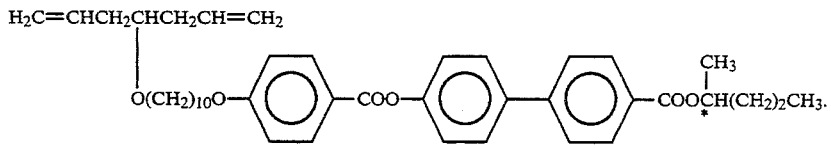

The high polymer may have liquid crystal phases or have no liquid crystal phases. Since the high polymer is a comb-type polymer providing a sufficiently wide space between side chains, it is compatible with the low molecular weight smectic liquid crystal, and the low molecular weight smectic liquid crystal comes into the space between the side chains to form a uniform mixture. FIG. 1 is a schematic view illustrating the mixed state of the ferroelectric liquid crystal composition of the present invention. A referential number 1 represents the novel high polymer, and a referential number 2 represents the low molecular weight smectic liquid crystal.

Since the ferroelectric liquid crystal composition of the present invention forms a uniform mixture as described above, it exhibits a high contrast ratio and respond to external factors at a high speed. Further, due to the high polymer contained therein, it has excellent ability to be oriented and its alignment can be controlled easily. Therefore, the liquid crystal composition of the present invention can simplify the procedure of producing liquid crystal optical devices.

Even if the low molecular weight smectic liquid crystal to be mixed is a non-chiral smectic liquid crystal, the optically active group introduced in the comb-type polymer plays a role as a chiral dopant, thereby endowing the liquid crystal composition with ferroelectricity.

The method of mixing the high polymer and the low molecular weight smectic liquid crystal is not particularly limited, and either direct mixing or solution mixing may be employed. For example, solution mixing may be suitably carried out by putting predetermined amounts of the high polymer and the low molecular weight smectic liquid crystal in a container, dissolving them in a solvent, such as dichloromethane, mixing the solution, and then evaporating the solvent.

A preferred ratio of the high polymer mixed is 5 to 99% by weight, more preferably 30 to 90% by weight, based on the total of the high polymer and the low molecular weight smectic liquid crystal. If the ratio of the high polymer is less than 5% by weight, the liquid crystal composition may have decreased moldability into film and decreased capability of orientation. Further, when a low molecular weight non-chiral smectic liquid crystal is mixed with less than 5% by weight of the high polymer, the liquid crystal composition may not exhibit ferroelectricity. If the ratio of the high polymer is more than 99% by weight, the speed of responding to the change of electric field may be decreased. Further, if a high polymer having no liquid crystal phases is used in such a high ratio, the liquid crystal composition may not have liquid crystal phases, or, if any, the temperature range of the liquid crystal phases may be narrow. It is preferable to adjust the ratio of the high polymer to the low molecular weight smectic liquid crystal so that the liquid crystal composition exhibits a ferroelectric phase exhibiting high response to electric fields. Although such a ratio cannot be defined uniformly since it depends on the kinds of the high polymer and the low molecular weight liquid crystal, ferroelectricity can be easily obtained by using at least one low molecular weight smectic liquid crystal containing an asymmetric carbon. The ferroelectric liquid crystal composition of the present invention may contain other additives, such as coloring matters and adhesives.

Examples of the present invention are set forth below. It will be understood that these examples are for purposes of illustration only and are not to be construed as limiting the invention. In the formulas showing phase transition behavior, "Cryst" represents crystal phase, "$S_C^*$" represents chiral smectic C phase, "$S_C$" represents smectic C phase, "$S_A$" represents smectic A phase, "N" represents nematic phase, "Iso" represents isotropic phase and "glass" represents glass state. In the following Examples, "Mw" represents the weight average molecular weight measured by GPC (gel permeation chromatography). In the formulas showing phase transition behaviors, the phase transition temperatures are expressed in °C.

EXAMPLES 1 TO 20

Example 1

(Synthesis 1)

Synthesis of high polymer A
1) Synthesis of 3-(10-bromodecyloxy)-1,5-hexadiene [Compound (1)]

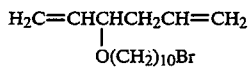

10 g of 1,5-hexadien-3-ol was dissolved in 100 ml of tetrahydrofuran (THF), and the atmosphere was replaced with argon. 4.1 g of 60% sodium hydride was added little by little. After hydrogen gas had ceased to generate, a THF solution of 75 g of 1,10-dibromodecane was added, and reflux was carried out for 8 hours. The insoluble matter generated was filtered off, and the solvent was evaporated. The residue was purified by column chromatography, to obtain 11.3 g of the objective compound (1). (Yield: 35%).

2) Synthesis of methyl 4-{10-(1,5-hexadien-3-yloxy)-decyloxy}benzoate [Compound (2)]

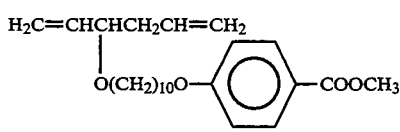

10 g of the compound (1), 4.8 g of methyl p-hydroxybenzoate and 4.4 g of potassium carbonate were refluxed in 2-butanone for 12 hours. The insoluble matter generated was filtered off, and the solvent was evaporated. The residue was purified by column chromatography, to obtain 9.3 g of the objective compound (2). (Yield: 76%)
3) Synthesis of 4-{10-(1,5-hexadien-3-yloxy)decyloxy} benzoic acid [Compound (3)]

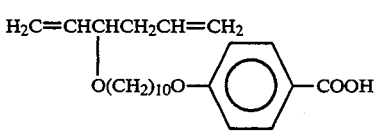

9.3 g of the compound (2), 4.0 g of potassium hydroxide and 1 ml of water were dissolved in methanol, and reflux was carried out for one hour. After addition of 50 ml of water, reflux was further carried out for three hours. The reaction mixture was adjusted to pH 2 by adding diluted hydrochloric acid. The precipitate was collected by filtration and was then washed with water, to obtain 8.1 g of the objective compound (3). (Yield: 90%)
4) Synthesis of monomer (a)

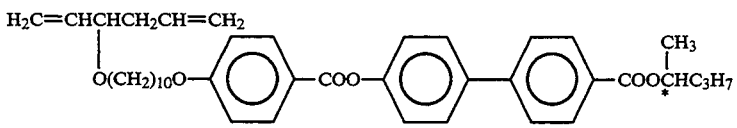

8.0 g of the compound (3), 6.0 g of thionyl chloride and catalytic amount of pyridine were mixed, and the mixture was stirred for two hours at 80° C. Excessive thionyl chloride was distilled off under reduced pressure to obtain an acid chloride. The acid chloride was dissolved in toluene to be used in the following reaction.

To the toluene solution added was a toluene solution containing 6.1 g of (S)-1-methylbutyl 4'-hydroxybiphenyl-4-carboxylate and 2.0 g of pyridine, and the mixture was stirred for one day at room temperature. The insoluble matter generated was filtered off, and the residue was purified by column chromatography, to obtain 10.4 g of the monomer (a). (Yield: 76%)
5) Synthesis of high polymer A

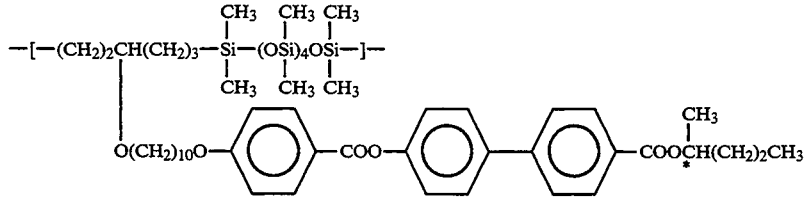

Phase transition behavior $$\text{glass} \longleftarrow Sc^- \longleftarrow \text{Iso (°C)}$$
$$\qquad\qquad -10 \qquad\quad 98$$

Figure 2:
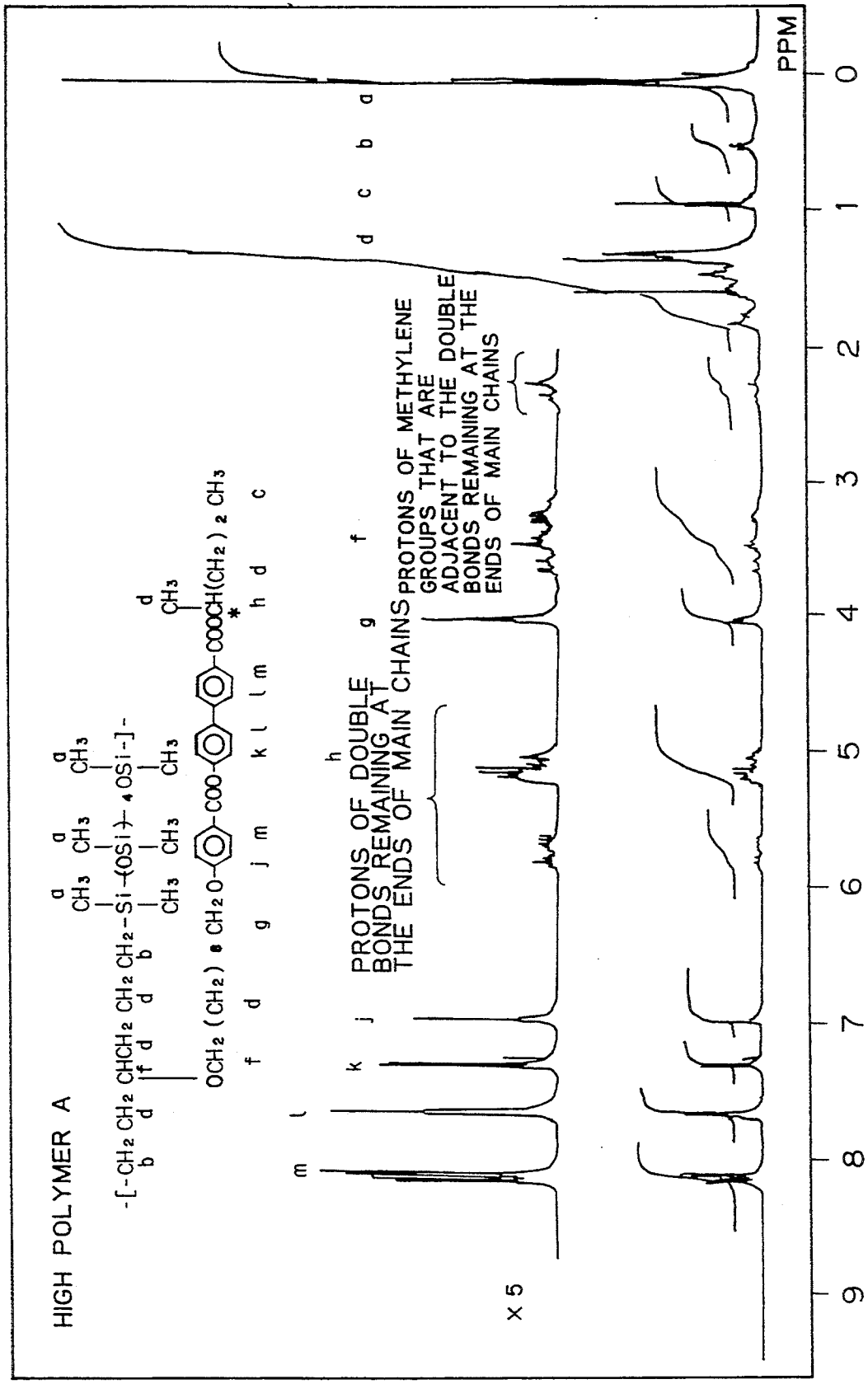
FIG. 2 is an NMR spectrum of the high polymer A obtained in Example 1.

2.00 g of the monomer (a) and 0.90 g of α,ω-hydrogen olygodimethylsiloxane (Mw: 670) were dissolved in toluene, and the atmosphere was replaced with argon. After addition of catalytic amount of hydrogen hexachloroplatinate (IV) hexahydrate, reaction was carried out at 85° C. for 6 hours. After the toluene was distilled off under reduced pressure, the residue was purified by column chromatography, to obtain 2.4 g of the high polymer A. (Yield: 83%) The structure of the high polymer A was confirmed by NMR to comprise the above recurring unit. The NMR chart is shown in FIG. 2.

Example 2

(Synthesis 2)

Synthesis of high polymer B

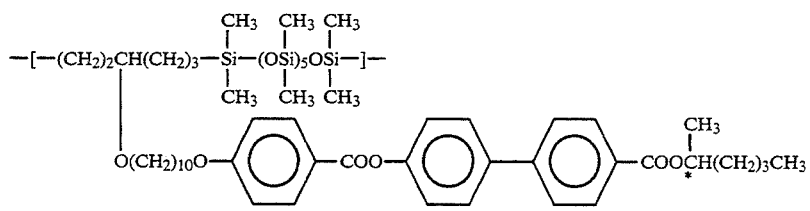

Phase transition behavior

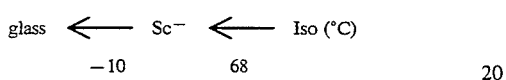

Figure 3:
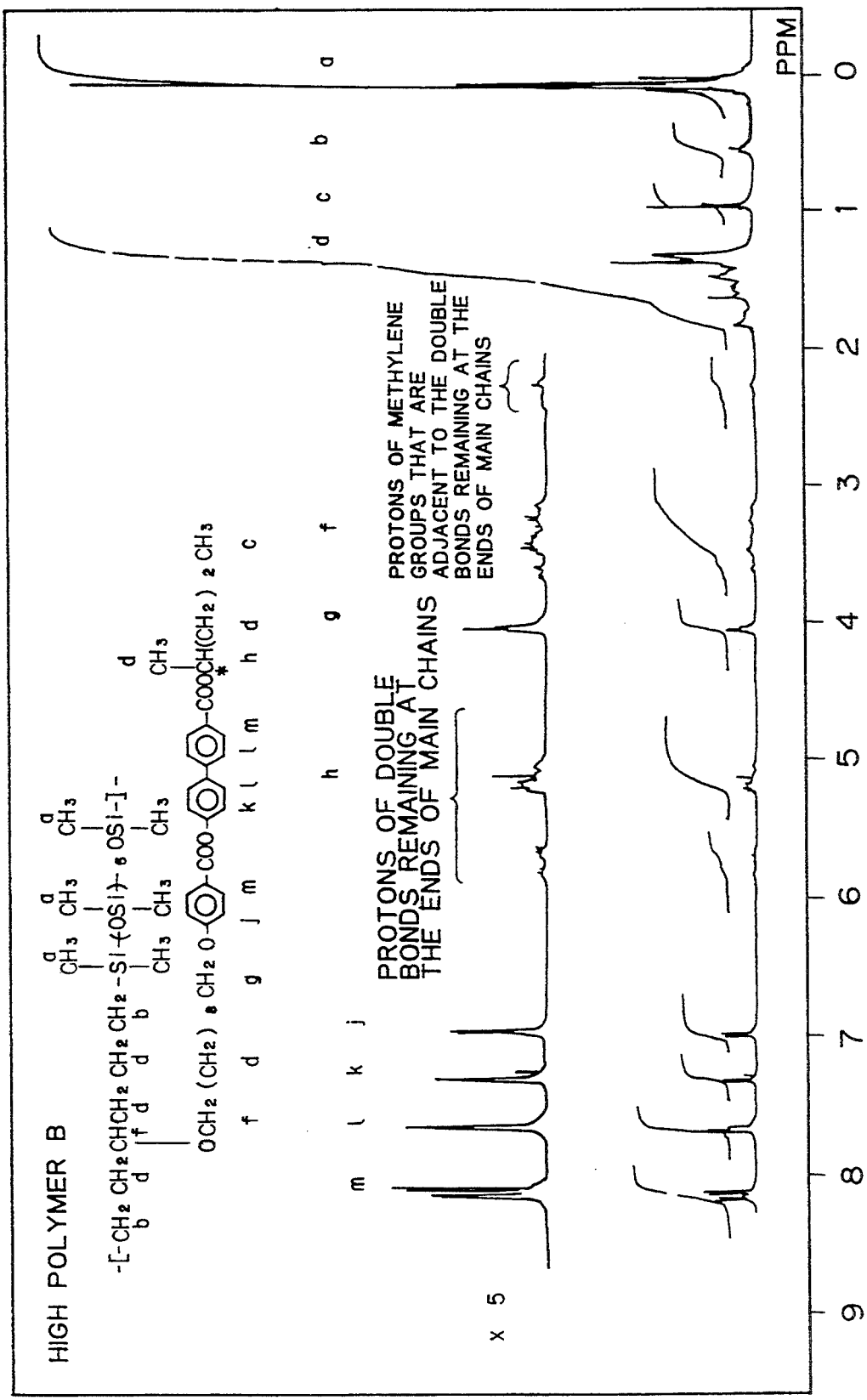
FIG. 3 is an NMR spectrum of the high polymer B obtained in Example 2.

2.00 g of the monomer (a) obtained in Example 1-4) and 1.04 g of α,ω-hydrogen olygodimethylsiloxane (Mw: 780) were dissolved in toluene, and the atmosphere was replaced with argon. After addition of catalytic amount of hydrogen hexachloroplatinate (IV) hexahydrate, reaction was carried out at 85° C. for 6 hours. After the toluene was distilled off under reduced pressure, the residue was purified by column chromatography, to obtain 2.6 g of the high polymer B. (Yield: 87%) The structure of the high polymer B was confirmed by NMR to comprise the above recurring units. The NMR chart is shown in FIG. 3.

Example 3

(Synthesis 3)

Synthesis of high polymer C

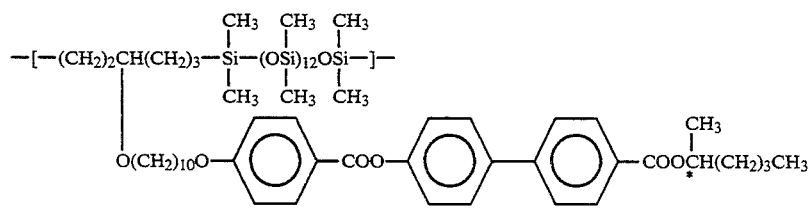

Phase transition behavior

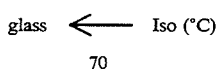

Figure 4:
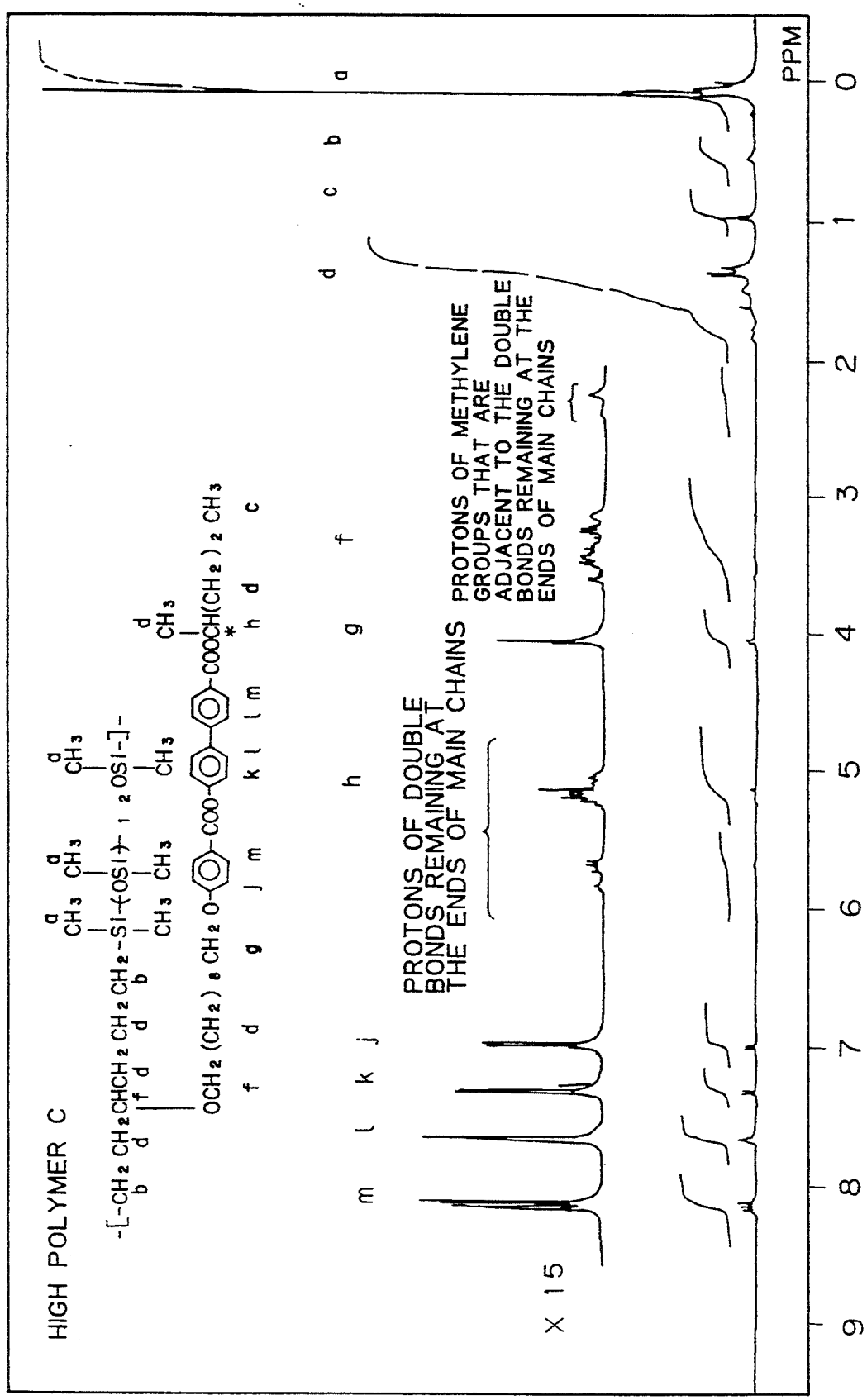
FIG. 4 is an NMR spectrum of the high polymer C obtained in Example 3.

2.0 g of the monomer (a) obtained in Example 1-4) and 2.1 g of α,ω-hydrogen olygodimethylsiloxane (Mw: 1400 were dissolved in toluene, and the atmosphere was replaced with argon. After addition of catalytic amount of hydrogen hexachloroplatinate (IV) hexahydrate, reaction was carried out at 85° C. for 6 hours. After the toluene was distilled off under reduced pressure, the residue was purified by column chromatography, to obtain 3.5 g of the high polymer C. (Yield: 85%) The structure of the high polymer C was confirmed by NMR to comprise the above recurring units. The NMR chart is shown in FIG. 4.

Example 4

(Synthesis 4)

Synthesis of High polymer D

1) Synthesis of 4-(10-bromodecyloxy)-1,6-heptadiene [Compound (4)]

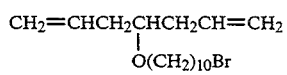

8.9 g of 60% sodium hydride was suspended in 100 ml of THF, and 25 g of 1,6-heptadien-4-ol dissolved in 50 ml of THF was dropped therein in an atmosphere of argon. 94 g of 1,10-dibromodecane dissolved in 50 ml of THF was further dropped therein, and reflux was carried out for 13 hours in an atmosphere of argon. After the generated precipitate was filtered off, the solvent was evaporated, and the residue was purified by silica gel column chromatography, to obtain 19 g of the compound (4). (Yield: 26%)

2) Synthesis of methyl 4-{10-(1,6-heptadien-4-yloxy)-decyloxy}benzoate [Compound (5)]

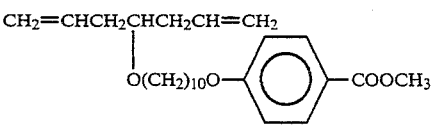

15 g of the compound (4), 8.3 g of methyl 4-hydroxybenzoate and 23 g of potassium carbonate were dissolved in 100 ml of 2-butanone, and reflux was carried out for 11 hours in an atmosphere of argon. After the solid matter generated was filtered off, the solvent was evaporated, and the residue was purified by a chromatography using a column filled with alumina and silica gel, to obtain 14 g of the compound (5). (Yield: 77%)

3) 4-{10-(1,6-heptadien-4-yloxy)decyloxy}benzoic acid [Compound (6)]

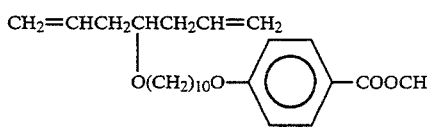

13 g of the compound (5) and 6 g of potassium hydroxide were dissolved in a solution mixture of 70 ml of water and 30 ml of methanol, and reflux was carried out for 6 hours. After addition of the reaction solution to 400 ml of water, the mixture was then adjusted approximately to pH 1 with concentrated hydrochloric acid. The white precipitate generated was collected by filtration, washed with water, and dried at 40° C. under reduced pressure, to obtain 12 g of the compound (6). (Yield: 96%)

4) Synthesis of monomer (b)

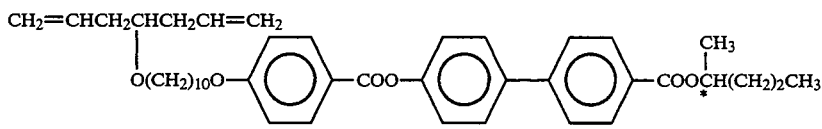

20 ml of thionyl chloride was added to 12 g of the compound (6), and the mixture was stirred for three hours at 60° C. The excessive thionyl chloride was distilled off under reduced pressure, to obtain an acid chloride. The acid chloride was dissolved in 50 ml of toluene, and, at room temperature, into the solution dropped were a toluene solution containing 14 g of (S)-1-methylbutyl 4'-hydroxybiphenyl-4-carboxylate and 3.1 g of pyridine dissolved in 100 ml of toluene, and stirring was then carried out for 15 hours at room temperature. After the solid matter generated was filtered off, the solvent was evaporated, and the residue was purified by a chromatography using a column filled with alumina and silica gel, to obtain 16 g of the monomer (b). (Yield: 79%)

5) Synthesis of high polymer D

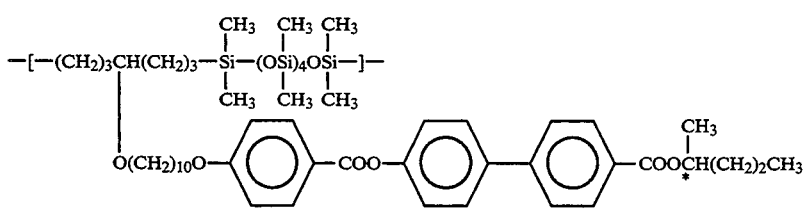

Mw = 2600

Phase transition behavior $$\text{glass} \longleftarrow \text{Sc}^- \longleftarrow \text{Iso (°C.)}$$
$$\quad\quad\quad -10 \quad\quad\quad 75$$

Figure 5:
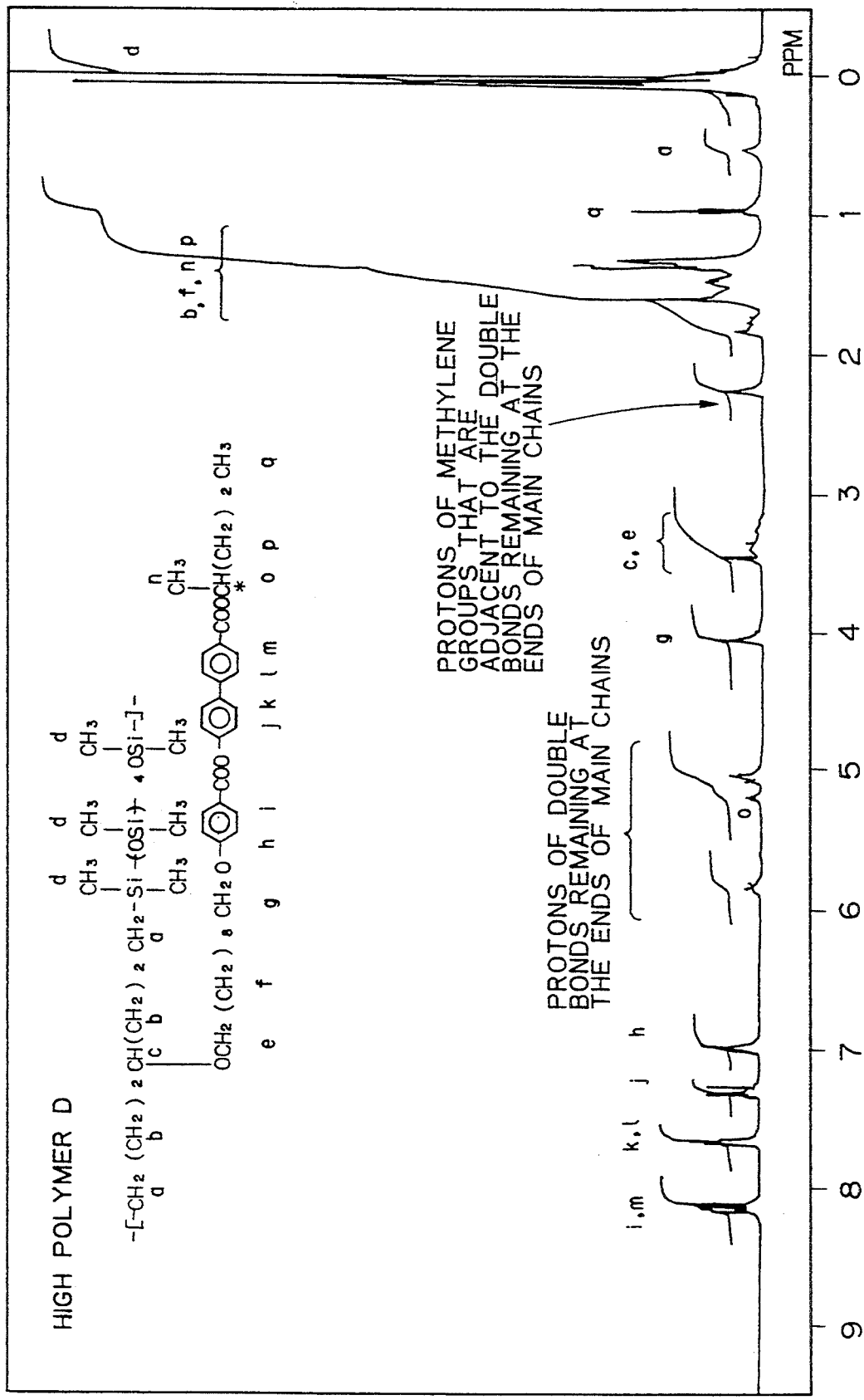
FIG. 5 is an NMR spectrum of the high polymer D obtained in Example 4.

0.8 g of the monomer (b) and 0.34 g of α,ω-hydrogen olygodimethylsiloxane (Mw: 670) were dissolved in 8 ml of toluene, and the atmosphere was replaced with argon. After addition of catalytic amount of hydrogen hexachloroplatinate (IV) hexahydrate, reaction was carried out at 85° C. for 8 hours. After the toluene was distilled off under reduced pressure, the residue was purified by silica gel column chromatography, to obtain 0.98 g of the high polymer D. (Yield: 86%) The structure of the high polymer D was confirmed by NMR to comprise the above recurring unit. The NMR chart is shown in FIG. 5.

Example 5

(Synthesis 5)

Synthesis of high polymer E

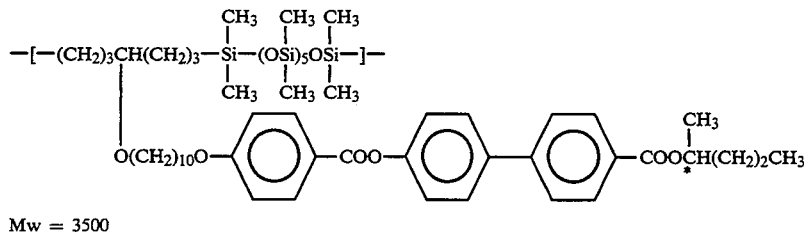

Mw = 3500

Phase transition behavior $$\text{glass} \longleftarrow \text{Sc}^- \longleftarrow \text{Iso (°C.)}$$
$$\quad\quad\quad -15 \quad\quad\quad 58$$

Figure 6:
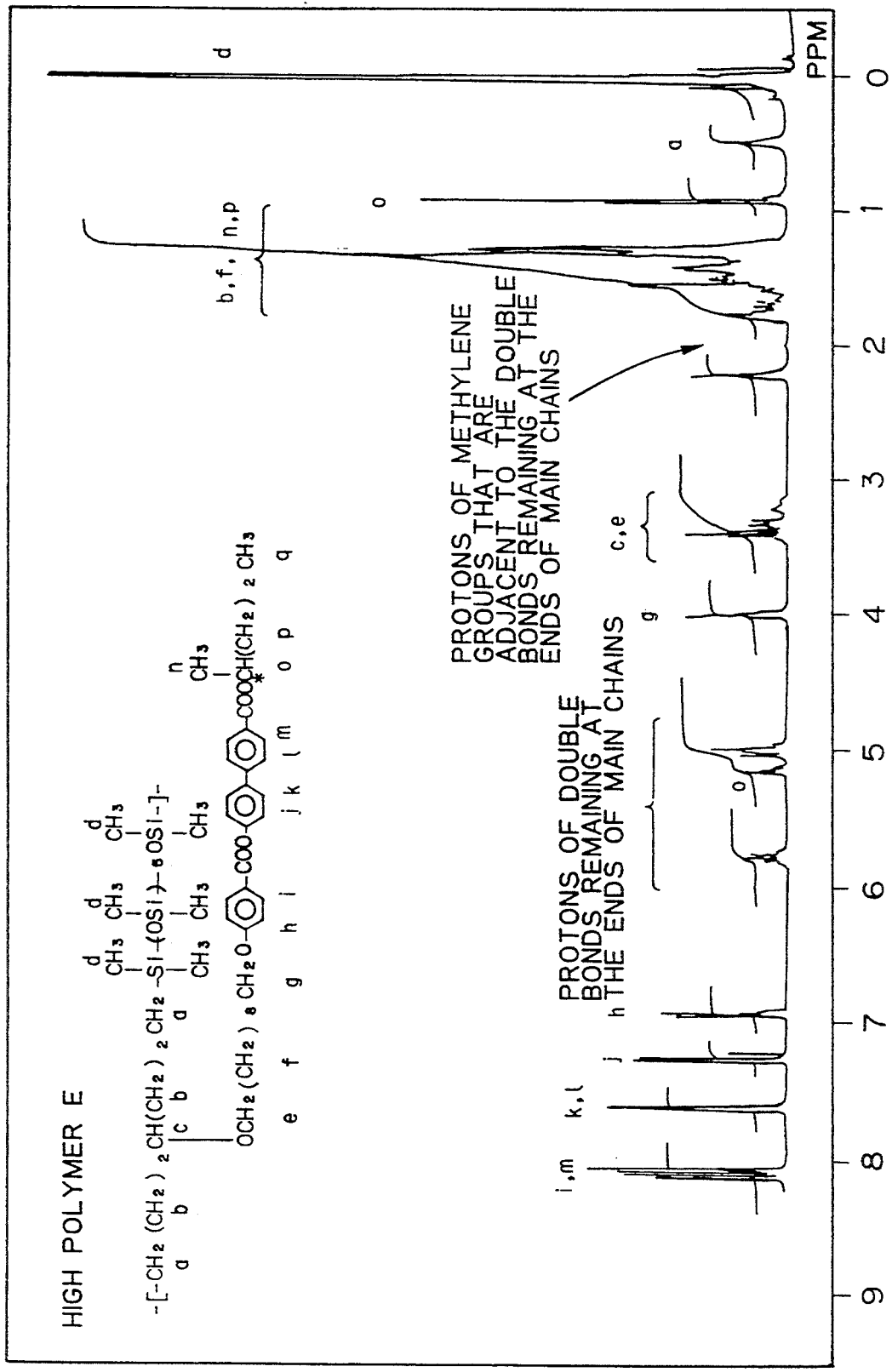
FIG. 6 is an NMR spectrum of the high polymer E obtained in Example 5.

1.0 g of the monomer (b) obtained in Example 4-4) and 0.51 g of α,ω-hydrogen olygodimethylsiloxane (Mw: 730) were dissolved in 8 ml of toluene, and the atmosphere was replaced with argon. After addition of catalytic amount of hydrogen hexachloroplatinate (IV) hexahydrate, reaction was carried out at 85° C. for 8 hours. After the toluene was distilled off under reduced pressure, the residue was purified by silica gel column chromatography, to obtain 1.3 g of the high polymer E. (Yield: 86%) The structure of the high polymer E was confirmed by NMR to comprise the above recurring unit. The NMR chart is shown in FIG. 6.

Example 6

(Synthesis 6)

Synthesis of high polymer F

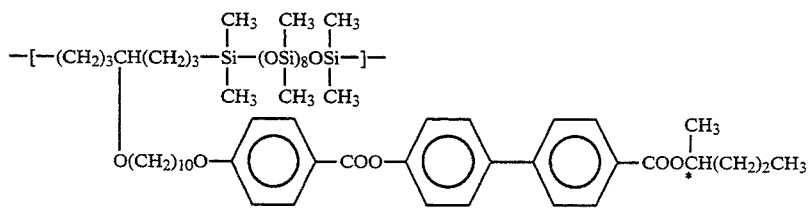

Mw = 3300

Phase transition behavior glass ⟵ Sc⁻ ⟵ Iso (°C.)
      −15      47

Figure 7:
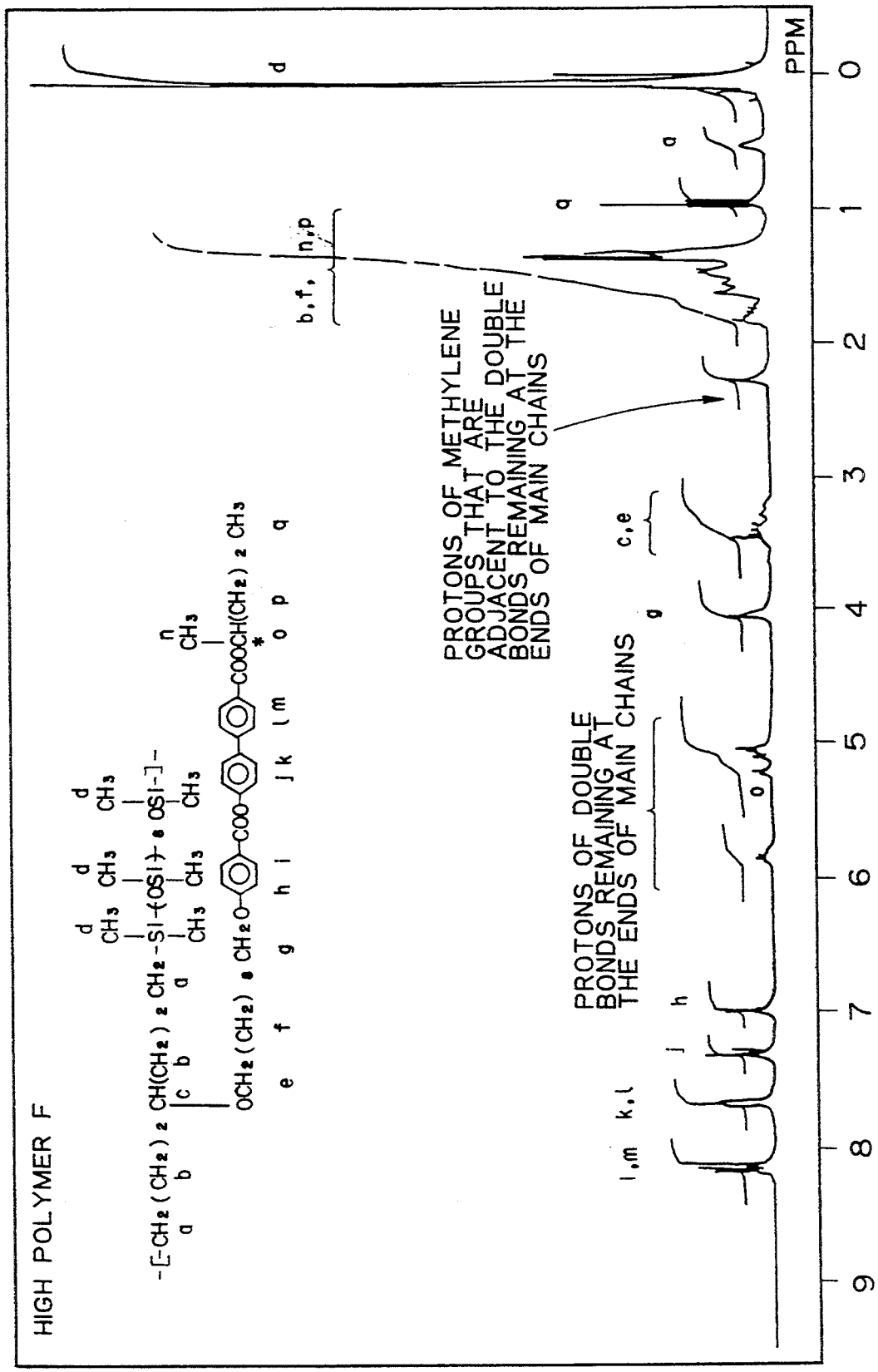
FIG. 7 is an NMR spectrum of the high polymer F obtained in Example 6.

0.80 g of the monomer (b) obtained in Example 4-4) and 0.59 g of α,ω-hydrogen olygodimethylsiloxane (Mw: 1200) were dissolved in 8 ml of toluene, and the atmosphere was replaced with argon. After addition of catalytic amount of hydrogen hexachloroplatinate (IV) hexahydrate, reaction was carried out at 85° C. for 8 hours. After the toluene was distilled off under reduced pressure, the residue was purified by silica gel column chromatography, to obtain 1.2 g of the high polymer F. (Yield: 86%) The structure of the high polymer F was confirmed by NMR to comprise the above recurring unit. The NMR chart is shown in FIG. 7.

Example 7

(Synthesis 7)

Synthesis of high polymer G

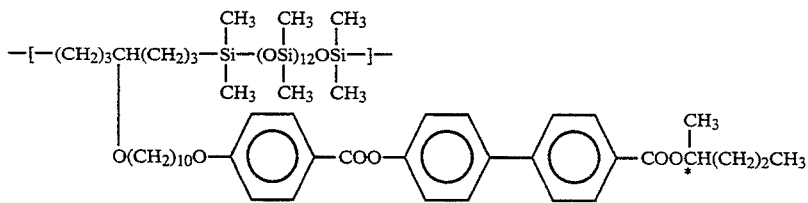

Mw = 4600

Phase transition behavior glass ⟵ Iso (°C)
       65

Figure 8:
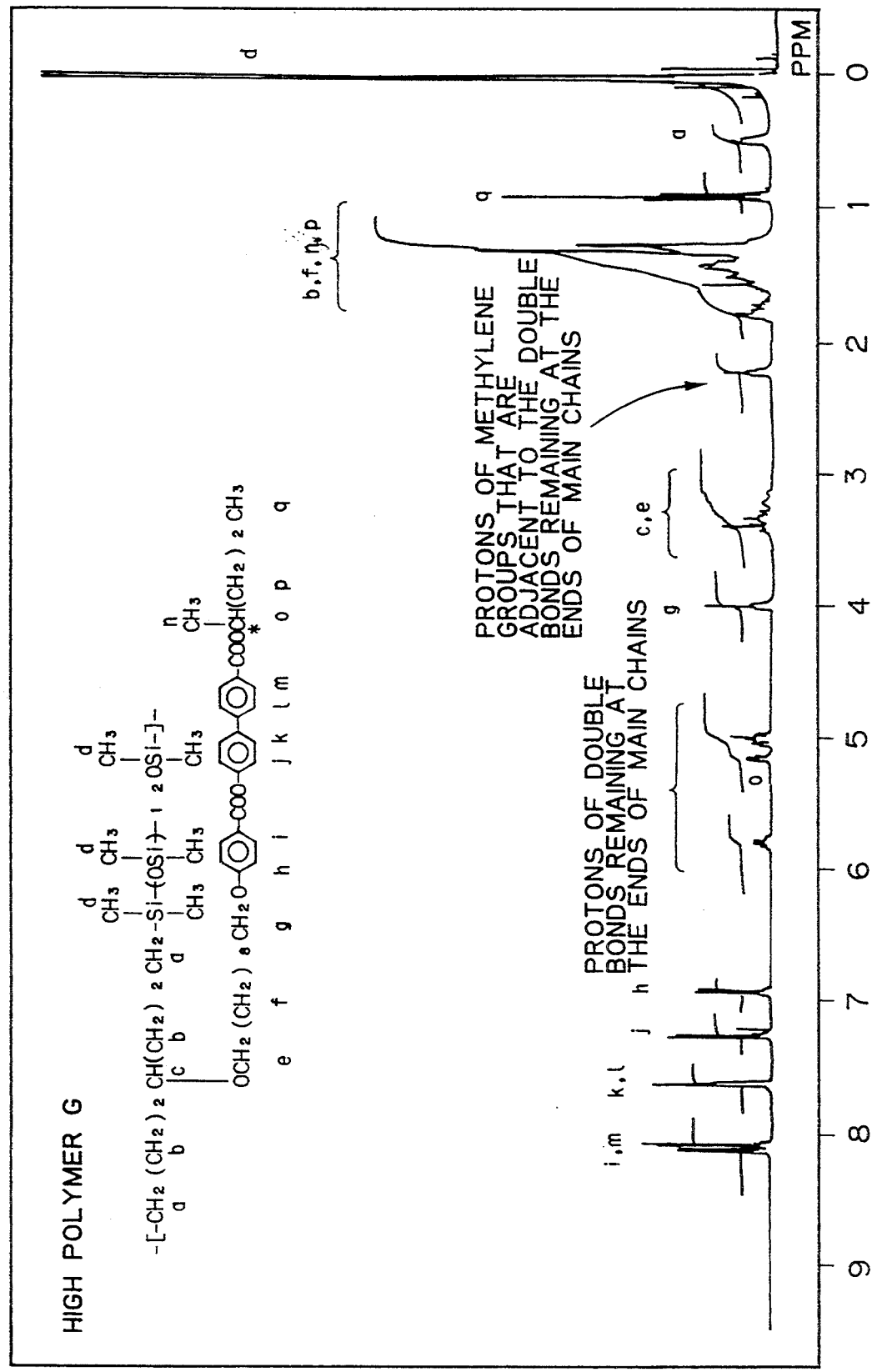
FIG. 8 is an NMR spectrum of the high polymer G obtained in Example 7.

1.0 g of the monomer (b) obtained in Example 4-4) and 1.0 g of α,ω-hydrogen olygodimethylsiloxane (Mw: 1400) were dissolved in 8 ml of toluene, and the atmosphere was replaced with argon. After addition of catalytic amount of hydrogen hexachloroplatinate hexahydrate, reaction was carried out at 85° C. for 8 hours. After the toluene was distilled off under reduced pressure, the residue was purified by silica gel column chromatography, to obtain 1.8 g of the high polymer G. (Yield: 90%) The structure of the high polymer G was confirmed by NMR to comprise the above recurring unit. The NMR chart is shown in FIG. 8.

Example 8

(Synthesis 8)

Synthesis of high polymer H

1) Synthesis of 5-(10-bromodecyloxy)-1,8-nonadiene [Compound (7)]

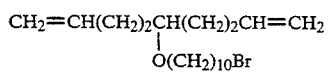

2.1 g of 60% sodium hydride was suspended in 50 ml of THF, and 6.6 g of 1,8-nonadien-5-ol was dropped therein in an atmosphere of argon. 28 g of 1,10-dibromodecane was further dropped therein, and reflux was then carried out for 21 hours in an atmosphere of argon. After the generated precipitate was filtered off, the solvent was evaporated, and the residue was purified by silica gel column chromatography, to obtain 5.3 g of the compound (7). (Yield: 31%)

2) Synthesis of methyl 4-{10-(1,8-nonadien-5-yloxy)-decyloxy}benzoate [Compound (8)]

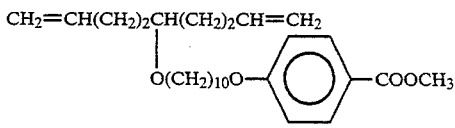

3 g of the compound (7), 1.5 g of methyl 4-hydroxybenzoate and 4.1 g of potassium carbonate were dissolved in 50 ml of 2-butanone, and reflux was carried out for 10 hours in an atmosphere of argon. After the precipitated solid matter was filtered off, the solvent was evaporated, and the residue was purified by a chromatography using a column filled with alumina and silica gel, to obtain 2.3 g of the compound (8). (Yield: 64%)

3) Synthesis of 4-{10-(1,8-nonadien-5-yloxy)decyloxy} benzoic acid [Compound (9)]

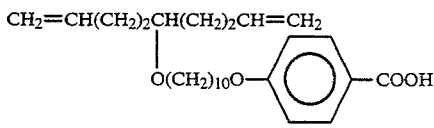

2.3 g of the compound (8) and 1.1 g of potassium hydroxide were dissolved in a solution mixture of 14 ml of water and 6 ml of methanol, and reflux was then carried out for 5 hours. The reaction solution was added into 100 ml of water, and the pH was adjusted approximately to 1 with concentrated hydrochloric acid. The waxen matter generated therein was washed with water and was then dried at 40° C. under reduced pressure, to obtain 2.1 g of the compound (9). (Yield: 93%)

4) Synthesis of monomer (c)

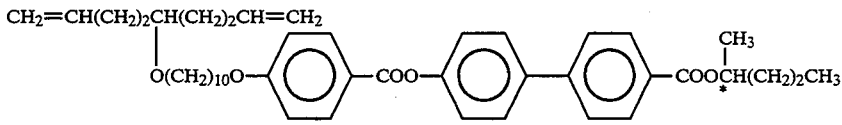

5 ml of thionyl chloride was added to 2.1 g of the compound (9), and the mixture was stirred for four hours at 60° C. The excessive thionyl chloride was distilled off under reduced pressure, to obtain an acid chloride. The acid chloride was dissolved in 5 ml of toluene, and, at room temperature, into the solution dropped was a toluene solution containing 2.2 g of (S)-1-methylbutyl 4'-hydroxybiphenyl-4-carboxylate and 0.50 g of pyridine dissolved in 20 ml of toluene, and stirring was then carried out for 18 hours at room temperature. After the solid matter generated was filtered off, the solvent was evaporated, and the residue was purified by a chromatography using a column filled with alumina and silica gel, to obtain 2.2 g of the monomer (c). (Yield: 63%)

5 Synthesis of high polymer H

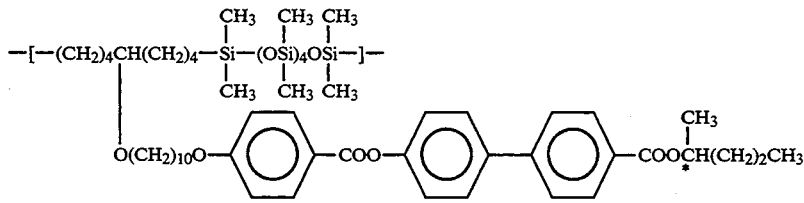

Mw = 3700

Phase transition behavior

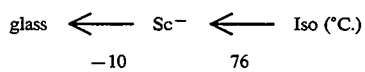

Figure 9:
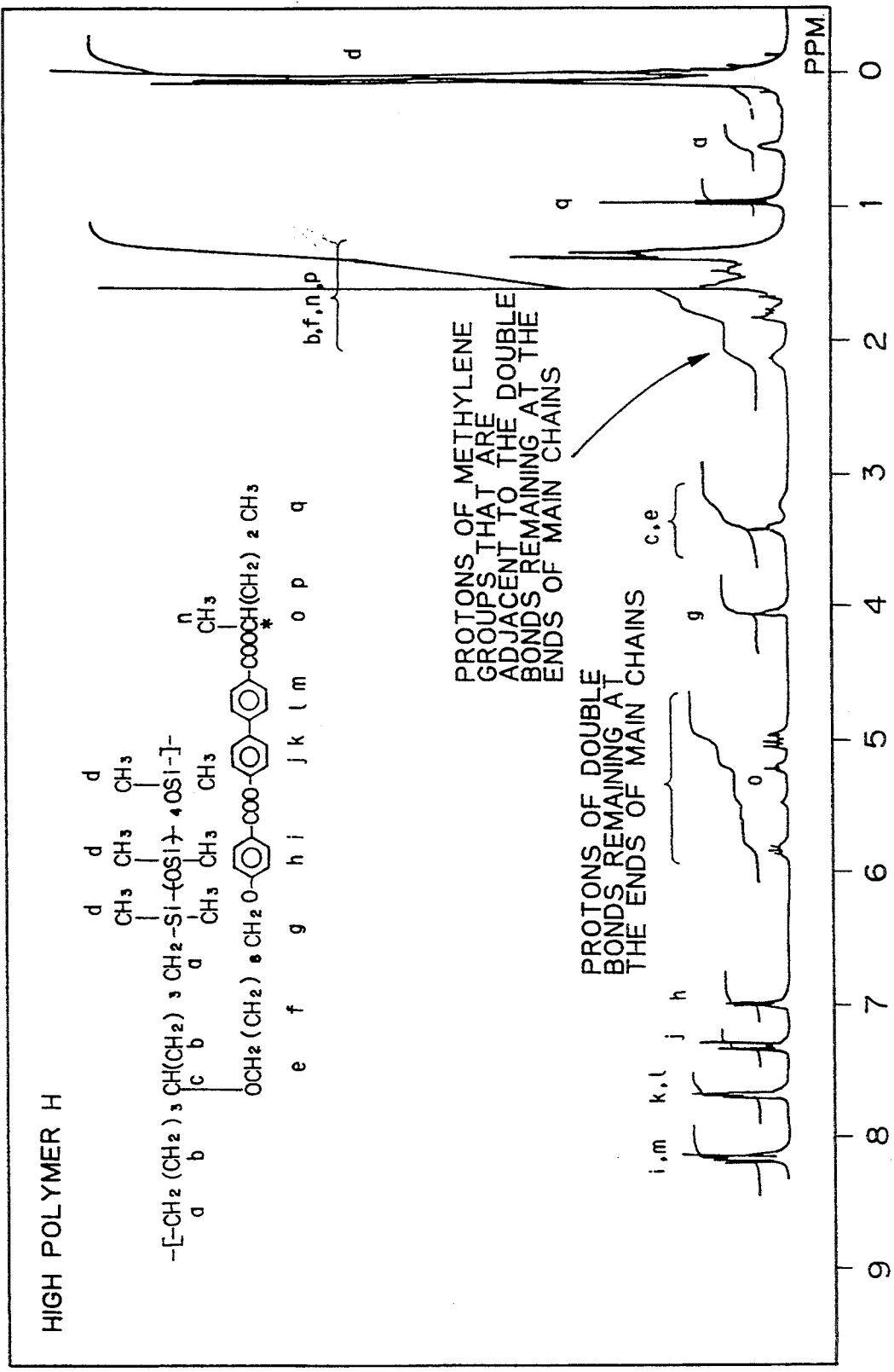
FIG. 9 is an NMR spectrum of the high polymer H obtained in Example 8.

0.8 g of the monomer (c) and 0.32 g of α,ω-hydrogen olygodimethylsiloxane (Mw: 670) were dissolved in 8 ml of toluene, and the atmosphere was replaced with argon. After addition of catalytic amount of hydrogen hexachloroplatinate (IV) hexahydrate, reaction was carried out at 85° C. for 8 hours. After the toluene was distilled off under reduced pressure, the residue was purified by silica gel column chromatography, to obtain 0.82 g of the high polymer H. (Yield: 73%) The structure of the high polymer H was confirmed by NMR to comprise the above recurring unit. The NMR chart is shown in FIG. 9.

Example 9

(Synthesis 9)

Synthesis of high polymer I

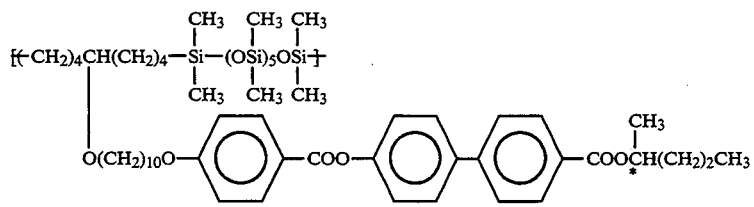

Phase transition behavior glass ⇐─ 50 ─SC ⇐─ 52 ─Iso(°C.)

Figure 10:
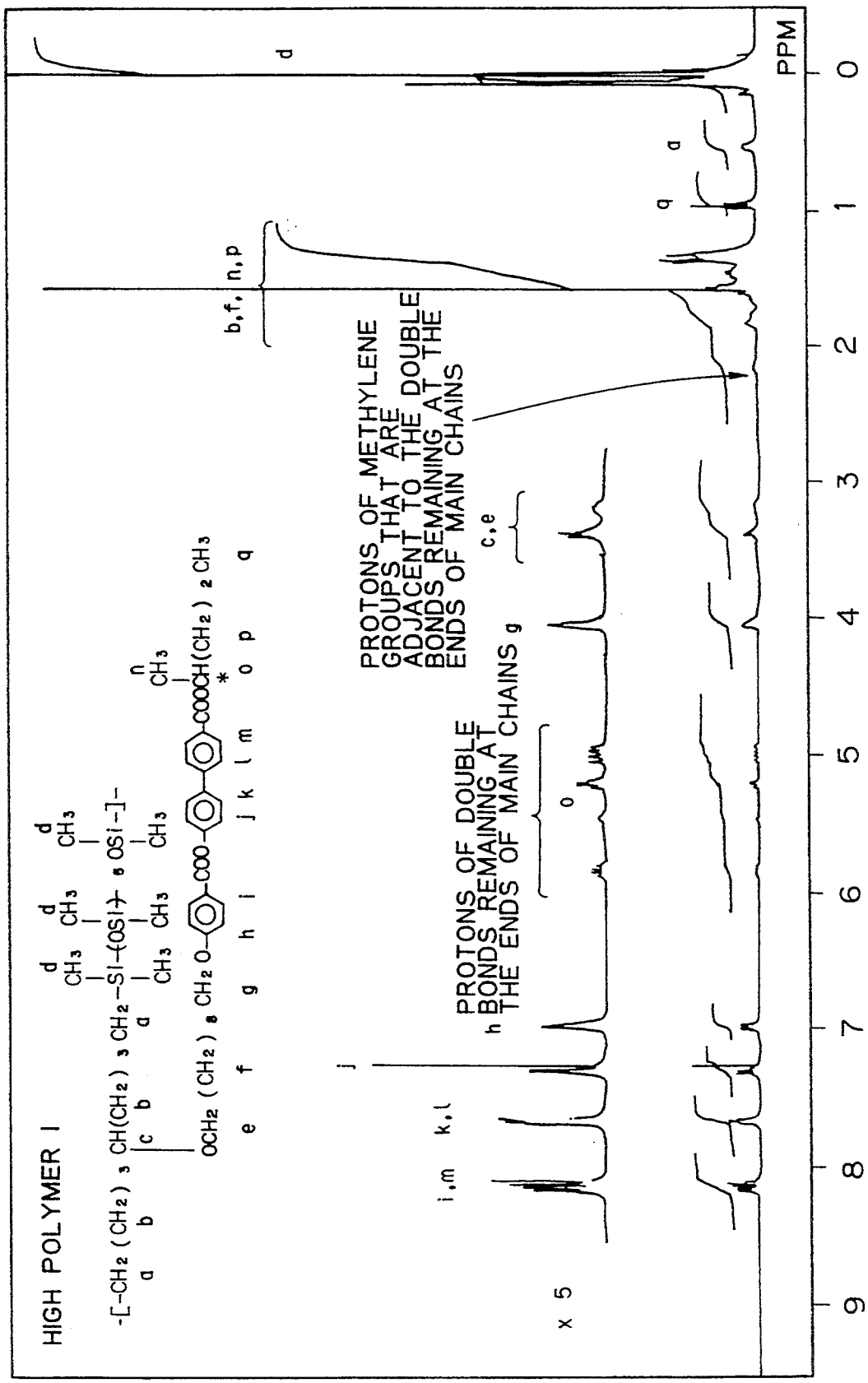
FIG. 10 is an NMR spectrum of the high polymer I obtained in Example 9.

1.0 g of the monomer (c) obtained in Example 8-4) and 0.49 g of α,ω-hydrogen olygodimethylsiloxane (Mw: 730) were dissolved in 8 ml of toluene, and the atmosphere was replaced with argon. After addition of catalytic amount of hydrogen hexachloroplatinate (IV) hexahydrate, reaction was carried out at 85° C. for 9 hours. After the toluene was distilled off under reduced pressure, the residue was purified by silica gel column chromatography, to obtain 1.3 g of the high polymer I. (Yield: 87%) The structure of the high polymer I was confirmed by NMR to comprise the above recurring unit. The NMR chart is shown in FIG. 10.

Example 10

(Synthesis 10)

Synthesis of high polymer J

1) Synthesis of monomer (d)

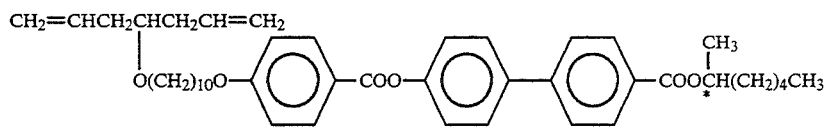

7.5 ml of thionyl chloride was added into 4.1 g of the compound (6) obtained in Example 4-3), and the mixture was stirred for 4 hours at 60° C. The excessive thionyl chloride was distilled off under reduced pressure, to obtain an acid chloride. The acid chloride was dissolved in 15 ml of toluene, and, at room temperature, thereto dropped was a toluene solution containing 3.7 g of (S)-1-methylhexyl 4'-hydroxybiphenyl-4-carboxylate and 1.1 g of pyridine dissolved in 10 ml of toluene, and stirring was then carried out at room temperature for 12 hours. After the solid matter generated was filtered off, the solvent was evaporated, and the residue was purified by a chromatography using a column filled with alumina and silica gel, to obtain 5.2 g of the monomer (d). (Yield: 72%)

2) Synthesis of high polymer J

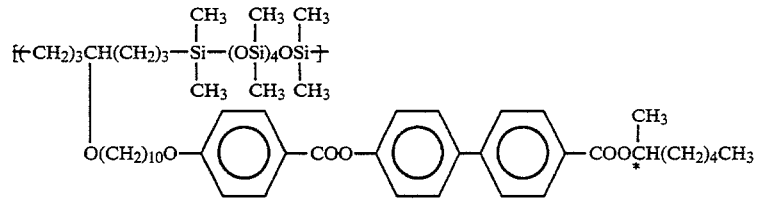

Phase transition behavior glass ⇄$_{-10}$ Sc ⇄$_{50}$ Iso (°C.)

Figure 11:
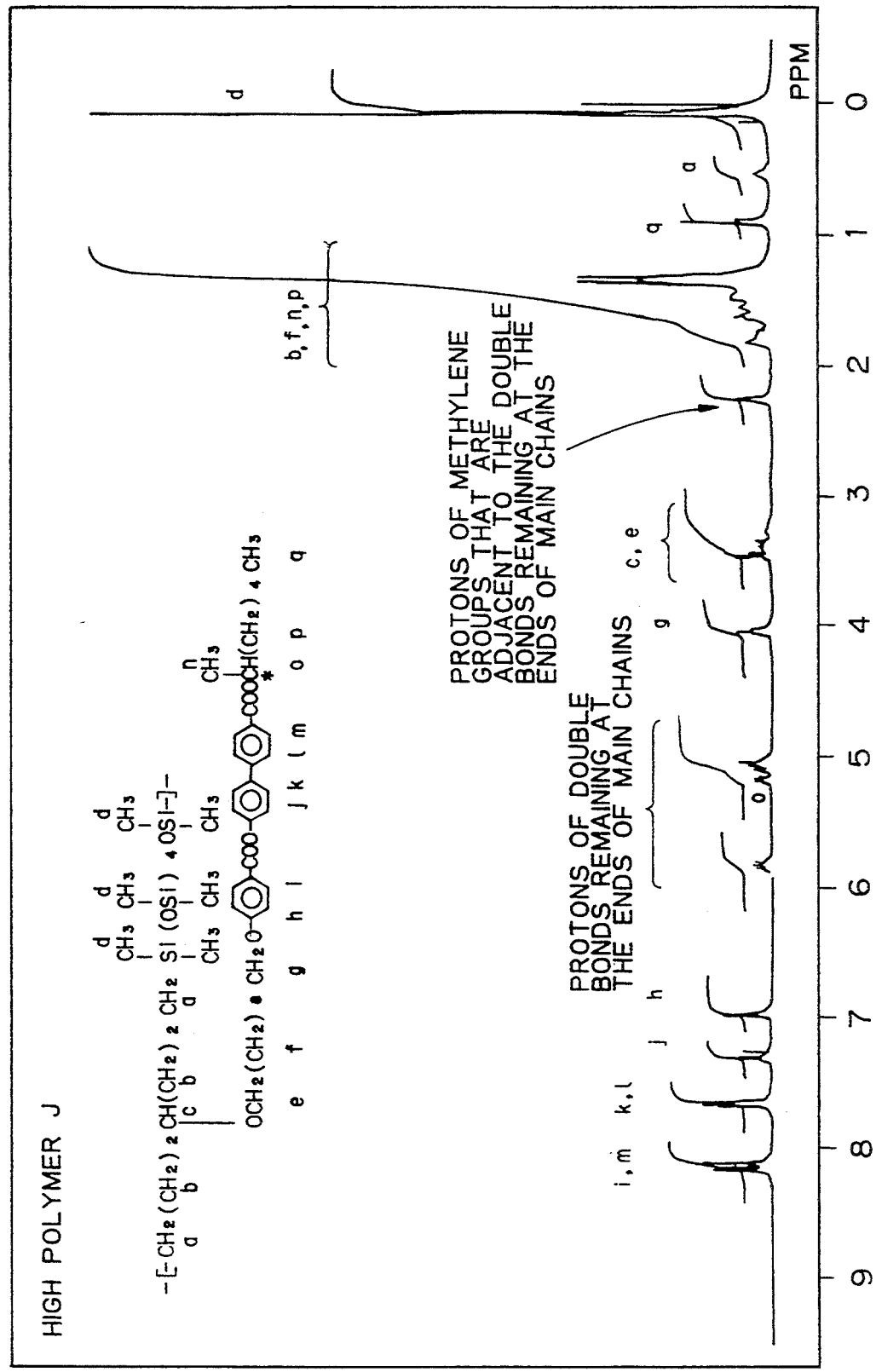
FIG. 11 is an NMR spectrum of the high polymer J obtained in Example 10.

0.8 g of the monomer (d) and 0.32 g of α,ω-hydrogen olygodimethylsiloxane (Mw: 670) were dissolved in 8 ml of toluene, and the atmosphere was replaced with argon. After addition of catalytic amount of hydrogen hexachloroplatinate (IV) hexahydrate, reaction was carried out at 85° C. for 9 hours. After the toluene was distilled off under reduced pressure, the residue was purified by silica gel column chromatography, to obtain 1.0 g of the high polymer J. (Yield: 89%) The structure of the high polymer J was confirmed by NMR to comprise the above recurring unit. The NMR chart is shown in FIG. 11.

Example 11

(Synthesis 11)

Synthesis of high polymer K

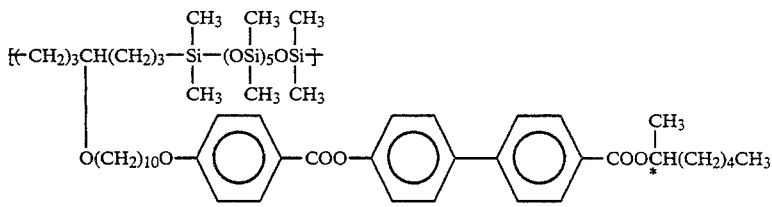

Phase transition behavior glass ⇄$_{30}$ Sc ⇄$_{32}$ Iso (°C.)

Figure 12:
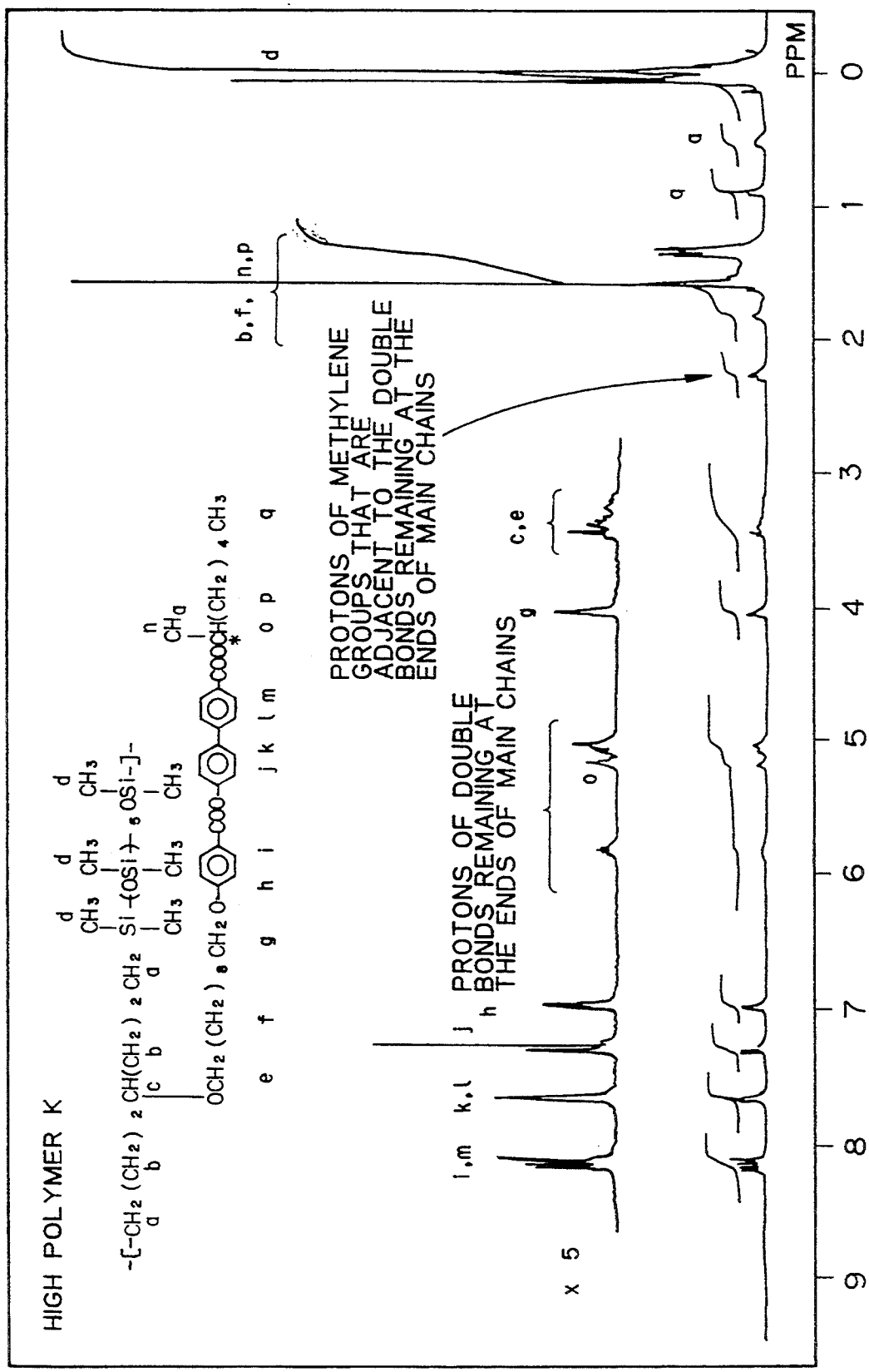
FIG. 12 is an NMR spectrum of the high polymer K obtained in Example 11.

0.8 g of the monomer (d) obtained in Example 10-1) and 0.39 g of α,ω-hydrogen olygodimethylsiloxane (Mw: 730) were dissolved in 8 ml of toluene, and the atmosphere was replaced with argon. After addition of catalytic amount of hydrogen hexachloroplatinate (IV) hexahydrate, reaction was carried out at 85° C. for 8 hours. After the toluene was distilled off under reduced pressure, the residue was purified by silica gel column chromatography, to obtain 0.98 g of the high polymer K. (Yield: 82%) The structure of the high polymer K was confirmed by NMR to comprise the above recurring unit. The NMR chart is shown in FIG. 12.

Example 12

(Synthesis 12)

Synthesis of high polymer L

1) Synthesis of monomer (e)

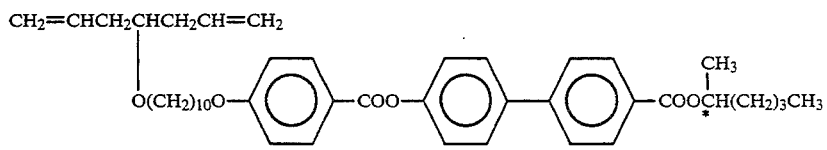

7.0 ml of thionyl chloride was added into 4.0 g of the compound (6) obtained in Example 4-3), and the mixture was stirred for 4 hours at 75° C. The excessive thionyl chloride was distilled off under reduced pressure, to obtain an acid chloride. The acid chloride was dissolved in 8 ml of toluene, and, at room temperature, thereto dropped was a toluene solution containing 3.4 g of (S)-1-methylpentyl 4'-hydroxybiphenyl-4-carboxylate and 1.0 g of pyridine dissolved in 10 ml of toluene, and stirring was then carried out at room temperature for 10 hours. After the solid matter generated was filtered off, the solvent was evaporated, and the residue was purified by a chromatography using a column filled with alumina and silica gel, to obtain 5.2 g of the monomer (e). (Yield: 75%)

2) Synthesis of high polymer L

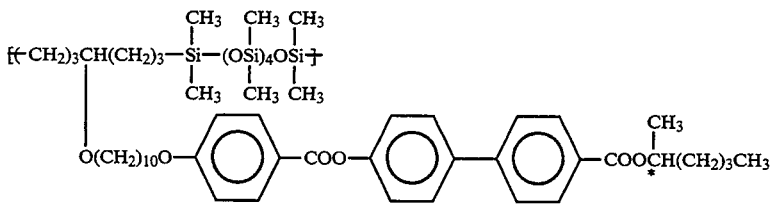

Phase transition behavior

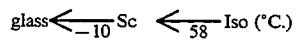

Figure 13:
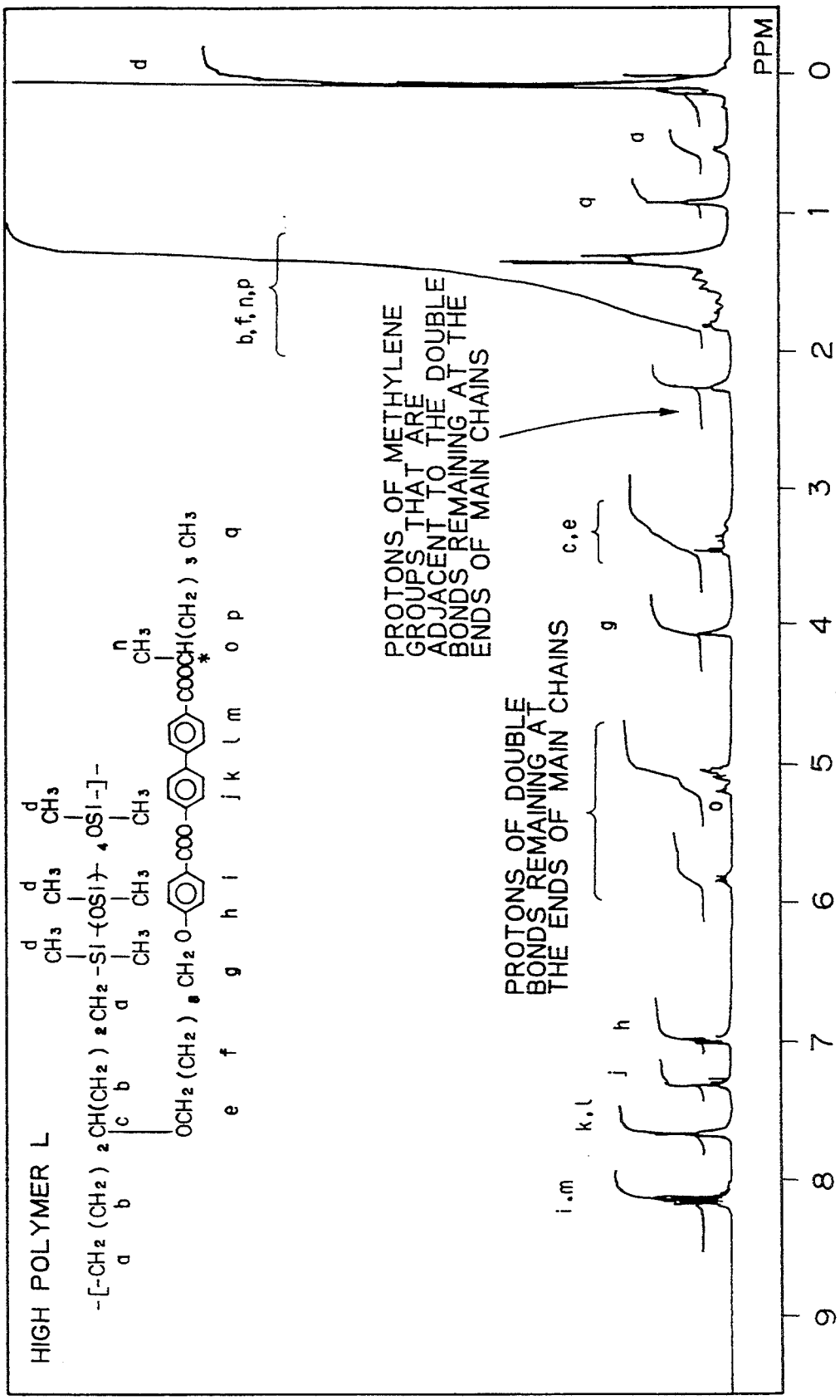
FIG. 13 is an NMR spectrum of the high polymer L obtained in Example 12.

0.7 g of the monomer (e) and 0.31 g of α,ω-hydrogen olygodimethylsiloxane (Mw: 670) were dissolved in 8 ml of toluene, and the atmosphere was replaced with argon. After addition of catalytic amount of hydrogen hexachloroplatinate (IV) hexahydrate, reaction was carried out at 85° C. for 9 hours. After the toluene was distilled off under reduced pressure, the residue was purified by silica gel column chromatography, to obtain 0.91 g of the high polymer L. (Yield: 90%) The structure of the high polymer L was confirmed by NMR to comprise the above recurring unit. The NMR chart is shown in FIG. 13.

Example 13

(Synthesis 13)

Synthesis of high polymer M

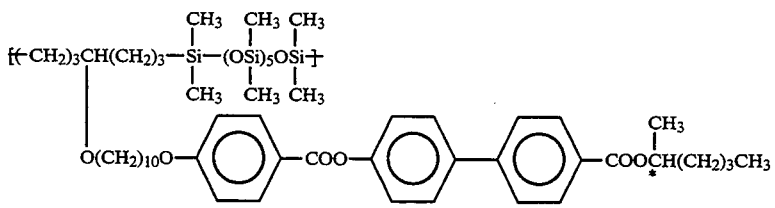

Phase transition behavior

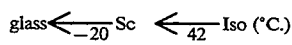

Figure 14:
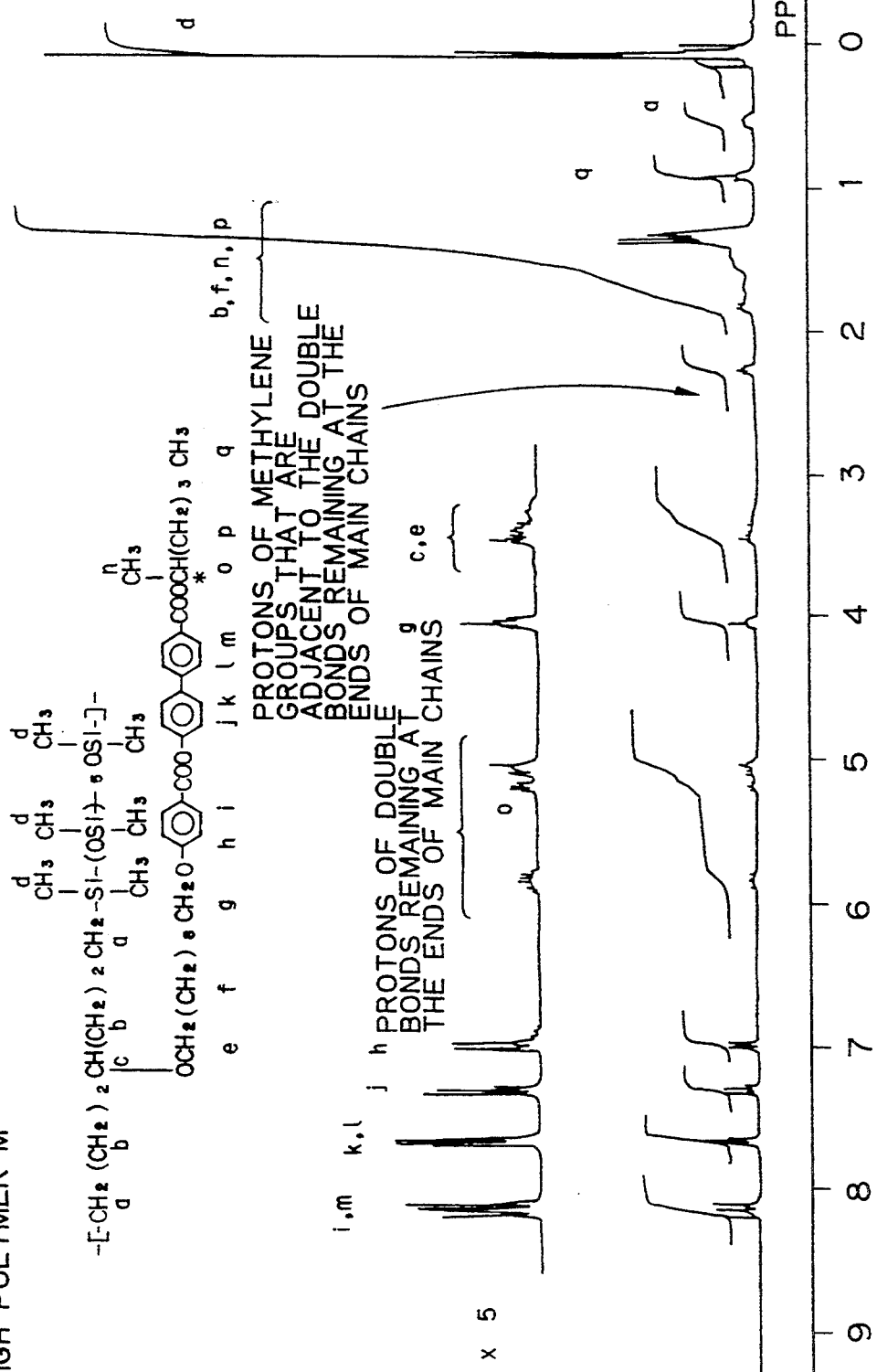
FIG. 14 is an NMR spectrum of the high polymer M obtained in Example 13.

0.7 g of the monomer (e) obtained in Example 12-1) and 0.37 g of α,ω-hydrogen olygodimethylsiloxane (Mw: 730) were dissolved in 8 ml of toluene, and the atmosphere was replaced with argon. After addition of catalytic amount of hydrogen hexachloroplatinate (IV) hexahydrate, reaction was carried out at 85° C. for 9 hours. After the toluene was distilled off under reduced pressure, the residue was purified by silica gel column chromatography, to obtain 0.91 g of the high polymer M. (Yield: 85%) The structure of the high polymer M was confirmed by NMR to comprise the above recurring unit. The NMR chart is shown in FIG. 14.

Example 14

The high polymer C and the low molecular weight smectic liquid crystal (produced by Midori Kagaku Kabushiki Kaisha) were mixed in the ratios listed in Table 1.

Low molecular weight smectic liquid crystal N

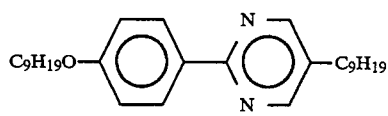

Phase transition behavior

Mixing method

The high polymer C and the low molecular weight smectic liquid crystal N were weighed out respectively to make the ratios listed in Table 1 (for example, when C:N=90:10, 90 mg and 10 mg, respectively), were dissolved in 5 ml of a solvent (dichloromethane) and mixed, and the mixture was then heated approximately to 100° C. to evaporate the solvent.

Figure 15:
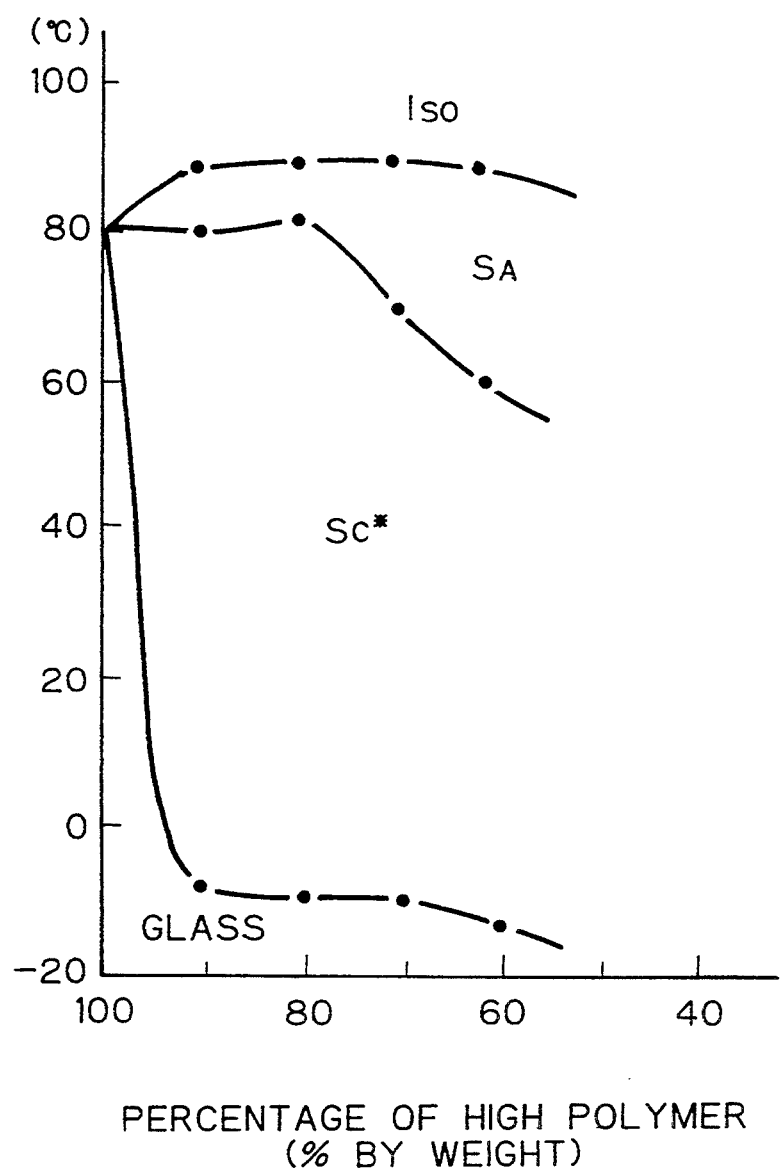
FIG. 15 is a phase diagram of the liquid crystal composition obtained in Example 14.

The phase diagram made from the phase transition behaviors of the thus obtained mixtures is shown in FIG. 15, which shows that they were mixed well in any of the ratios to ensure continuous phase transition.

When each composition was sandwiched between two glass substrates carrying their respective ITO electrodes on their surfaces facing each other, the island structure peculiar to dispersion systems was not observed with a polarizing microscope, but a uniform liquid crystal phase was observed. Thus the compositions were confirmed to form uniform mixture systems. The microscopic observation was carried out with the polarizing microscope adjusted to a magnification of ×400, while the temperature was being decreased from 80° C. to the room temperature.

After each composition was sandwiched between two glass substrates carrying their respective ITO electrodes on their surfaces facing each other (the area of each electrode: 0.5 cm²), orientation was carried out by applying a shear stress several times between the two substrates at 80° C. (S$_A$ phase) (cell thickness: 2 μm). A voltage of ±10 V was applied between the electrodes of the liquid crystal optical device thus obtained to measure the response time. The results are listed in Table 1.

The results show that the compositions exhibited ferroelectricity and responded to electric fields at high speed.

TABLE 1

| High polymer C: Low molecular weight smectic liquid crystal N | Phase transition behavior (°C.) | Response time (25° C.) |
|---|---|---|
| 90:10 (weight ratio) | glass ← S$_C$ ← S$_A$ ← Iso −10 79 87.4-82.0 | 5.3 ms |
| 80:20 (weight ratio) | glass ← S$_C$ ← S$_A$ ← Iso −10 85 91.2-85.9 | 1.9 ms |
| 70:30 (weight ratio) | glass ← S$_C$ ← S$_A$ ← Iso −10 68.5 92.2-86.8 | 580 μs |
| 60:40 (weight ratio) | glass ← S$_C$ ← S$_A$ ← Iso −15 60 89.9-83.0 | 340 μs |

Example 15

The high polymer A and the low molecular weight smectic liquid crystal P represented by the following formula were mixed in the ratios listed in Table 2.

Low molecular weight smectic liquid crystal P

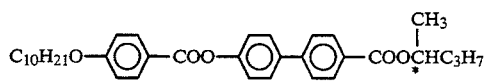

Phase transition behavior

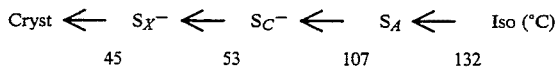

S$_x$* represents a smectic phase of a higher order than S$_C$*.

TABLE 2

| High polymer A: Low molecular weight smectic liquid crystal P | Phase transition behavior (°C.) | Response time (25° C.) |
|---|---|---|
| 80:20 (weight ratio) | glass ← S$_C$ ← S$_A$ ← Iso −10 80 105 | 0.9 ms |
| 40:60 (weight ratio) | glass ← S$_X$ ← S$_C$ ← S$_A$ ← Iso −10 20 103 120 | 160 μs |

The same mixing method as employed in Example 14 was employed.

After each composition was sandwiched between two glass substrates carrying their respective ITO electrodes on their surfaces facing each other (the area of each electrode: 0.5 cm$^2$), orientation was carried out by applying a shear stress several times between the two substrates at 100° C. as to the composition of the weight ratio of 80:20 (S$_A$ phase), and at 110° C. as to the composition of the weight ratio of 40:60 (S$_A$ phase) (cell thickness: 2 μm). A voltage of ±10 V was applied between the electrodes of the liquid crystal optical device thus obtained to measure the response time. The results are listed in Table 2.

The results show that the compositions exhibited ferroelectricity and responded to electric fields at high speed.

Example 16

Among the compositions prepared in Example 14, the one having a composition of high polymer C:low molecular weight smectic liquid crystal N=60:40 was used for producing a liquid crystal optical device as follows.

A toluene solution containing 20% by weight of the composition was prepared, and was then applied on the electrode surface of a polyether sulfone (PES) substrate with an ITO electrode, to form a coating of 3 μm. After drying off the solvent, another substrate of the same kind was laminated so that the electrode surface of the another substrate contacted the layer of the composition, to produce an unoriented device of 150 mm in width and 3 m in length.

Figure 16:
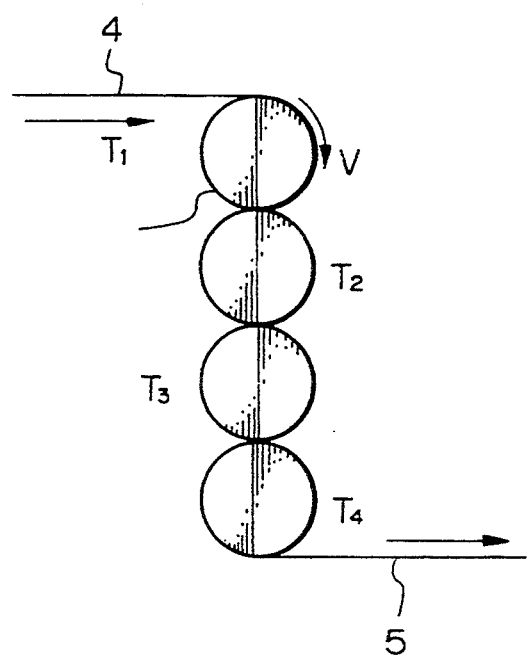
FIG. 16 is an drawing illustrating the orientation apparatus used in Example 16.

Subsequently, as shown in FIG. 16, the unoriented device 4 was bent to orient by using the orientation apparatus consisting of the four heating rolls 3. Each heating roll 3 is made of chromium-plated iron and is 80 mm in diameter and 300 mm in width. The surface temperatures of the heating rolls were adjusted to T$_1$=90° C., T$_2$=85° C., T$_3$=80° C. and T$_4$=77° C., and the line speed to v=8 m/min. By using this orientation apparatus, the liquid crystalline composition enclosed in the unoriented device 4 was cooled from isotropic phase to a liquid crystal phase while being applied with a shear stress due to bending, to produce an oriented device 5 wherein the liquid crystalline composition had a homogeneous structure aligned uniaxially in a direction perpendicular to the longitudinal direction of the substrates.

Two polarizers were arranged on the upper and lower sides of the oriented device with their polarizing axes crossed to each other. When applied a voltage of ±20 V between the electrodes, the device exhibited a high contrast ratio of 30.

These results prove that these compositions are suitable for the continuous production of liquid crystal optical devices by using the simple method as described above.

Example 17

The high polymer B and the low molecular weight smectic liquid crystal Q (produced by Midori Kagaku Kabushiki Kaisha) represented by the following formula were mixed in the ratios listed in Table 3.

Low molecular weight smectic liquid crystal Q

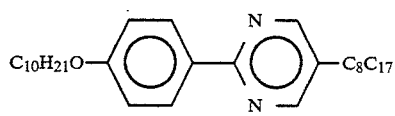

Phase transition behavior

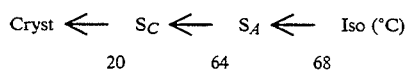

TABLE 3

| High polymer B: Low molecular weight smectic liquid crystal Q | Phase transition behavior (°C.) | Response time (25° C.) |
| --- | --- | --- |
| 85:15 (weight ratio) | glass ← $S_C$ ← Iso −15 92.5-84.5 | 3.4 ms |
| 70:30 (weight ratio) | glass ← $S_C$ ← $S_A$ ← Iso −15 89.5 92.5-89.6 | 3.1 ms |
| 65:35 (weight ratio) | glass ← $S_C$ ← $S_A$ ← Iso −15 84 89.2-86.0 | 3.2 ms |

The same mixing method as employed in Example 14 was employed.

Each composition was sandwiched between two glass substrates bearing their respective ITO electrodes on their surfaces facing each other to produce an unoriented liquid crystal device, and was then oriented by applying shear stress between the two substrates several times at 80° C., while a rectangular voltage of ±5 V and 10 Hz was being applied between the two electrodes (cell thickness 2 μm). The oriented device was allowed to cool, and was then applied with a voltage of ±10 V between the electrodes at 25° C. to measure its response time. The results are shown in Table 3. The high-speed response of the compositions was proved by the results.

Example 18

The high polymer B, the low molecular weight smectic liquid crystal Q and the following low molecular weight smectic liquid crystal R were mixed in a weight ratio of 50:30:20 (B:Q:R).

Low molecular weight smectic liquid crystal R (The monomer (a) prepared in Example 1)

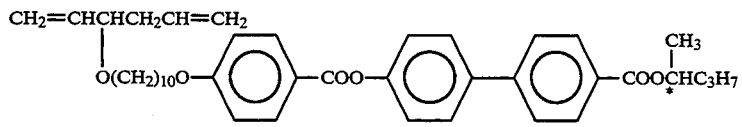

Phase transition behavior

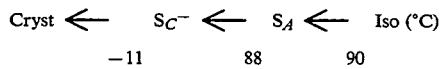

The mixing was carried out in the same manner as in Example 14. The obtained composition exhibited the following phase transition behavior:

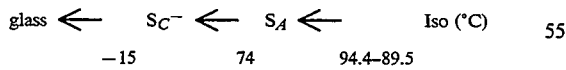

By using the composition, production of an oriented liquid crystal device was carried out in the same manner as in Example 15 with the exception that the orientation was carried out at 80° C. The response time measured by applying a voltage of ±10 V at 25° C. was 1.1 ms (cell thickness 2 μm).

Example 19

The high polymer E and the low molecular weight smectic liquid crystal Q were mixed in the ratios listed in Table 4.

TABLE 4

| High polymer E: Low molecular weight smectic liquid crystal Q | Phase transition behavior (°C.) | Response time (25° C.) |
| --- | --- | --- |
| 85:15 (weight ratio) | glass ← $S_C$ ← $S_A$ ← Iso −15 76 81.6-69 | 2.0 ms |
| 70:30 (weight ratio) | glass ← $S_C$ ← $S_A$ ← Iso −15 60 81.8-71 | 630 g s |

The mixing was carried out in the same manner as in Example 14.

By using the composition of the weight ratio of 85:15, production and orientation of a liquid crystal device were carried out in the same manner as in Example 17 with the exception that the orientation temperature was changed to 70° C. (cell thickness: 2 μm).

By using the composition of the weight ratio of 70:30, production and orientation of a liquid crystal device were carried out in the same manner as in Example 15 with the exception that the orientation temperature was changed to 68° C. (cell thickness: 2 μm).

The response times measured by applying a voltage of ±10 V at 25° C. are listed in Table 4.

Example 20

The high polymer E and the low molecular weigh smectic liquid crystals Q and R were mixed in an weight ratio of 50:20:30 (E:Q:R). The mixing was carried out in the same manner as in Example 14.

The obtained composition exhibited the following phase transition behavior:

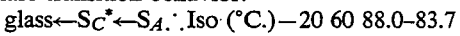

glass←$S_C^*$←$S_A$. Iso (°C.)−20 60 88.0-83.7

By using the composition, production of an oriented liquid crystal device was carried out in the same manner as in Example 15 with the exception that the orientation was carried out at 80° C. The response time measured by applying a voltage of ±10 V at 25° C. was 860 μs (cell thickness 2 μm).

What is claimed is:

1. A novel high polymer comprising a recurring unit represented by the formula:

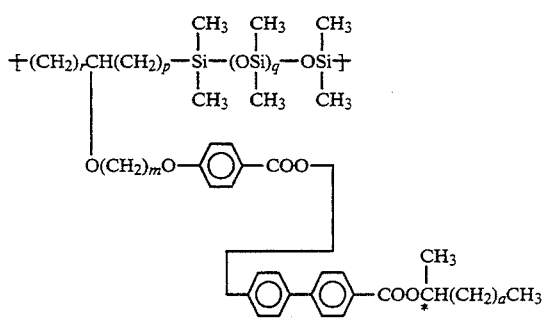

wherein r and p each represent an integer of 2 to 5,
q represents a number of 4 to 20,
m represents an integer of 8 to 12,
a represents an integer of 1 to 8,
and * represents an asymmetric carbon.

2. The novel high polymer as claimed in claim 1, wherein the high polymer has a weight average molecular weight of 1,000 to 1,000,000.

3. The novel high polymer as claimed in claim 2, wherein r represents an integer of 2 to 4, p represents an integer of 3 or 4, q represents a number of 4 to 12, m represents an integer of 10, and a represents an integer of 2 to 4.

4. The novel high polymer as claimed in claim 3, wherein the recurring units are selected from the group consisting of

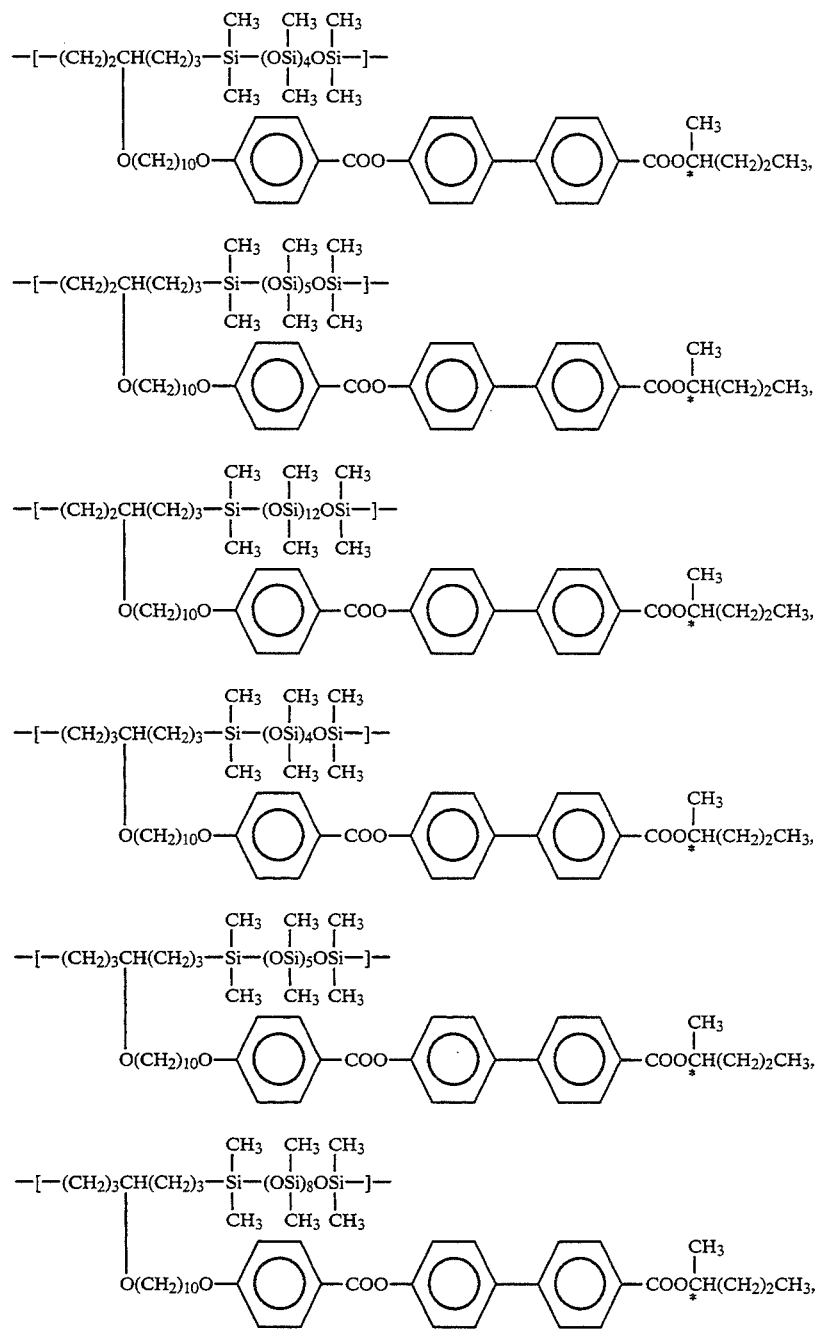

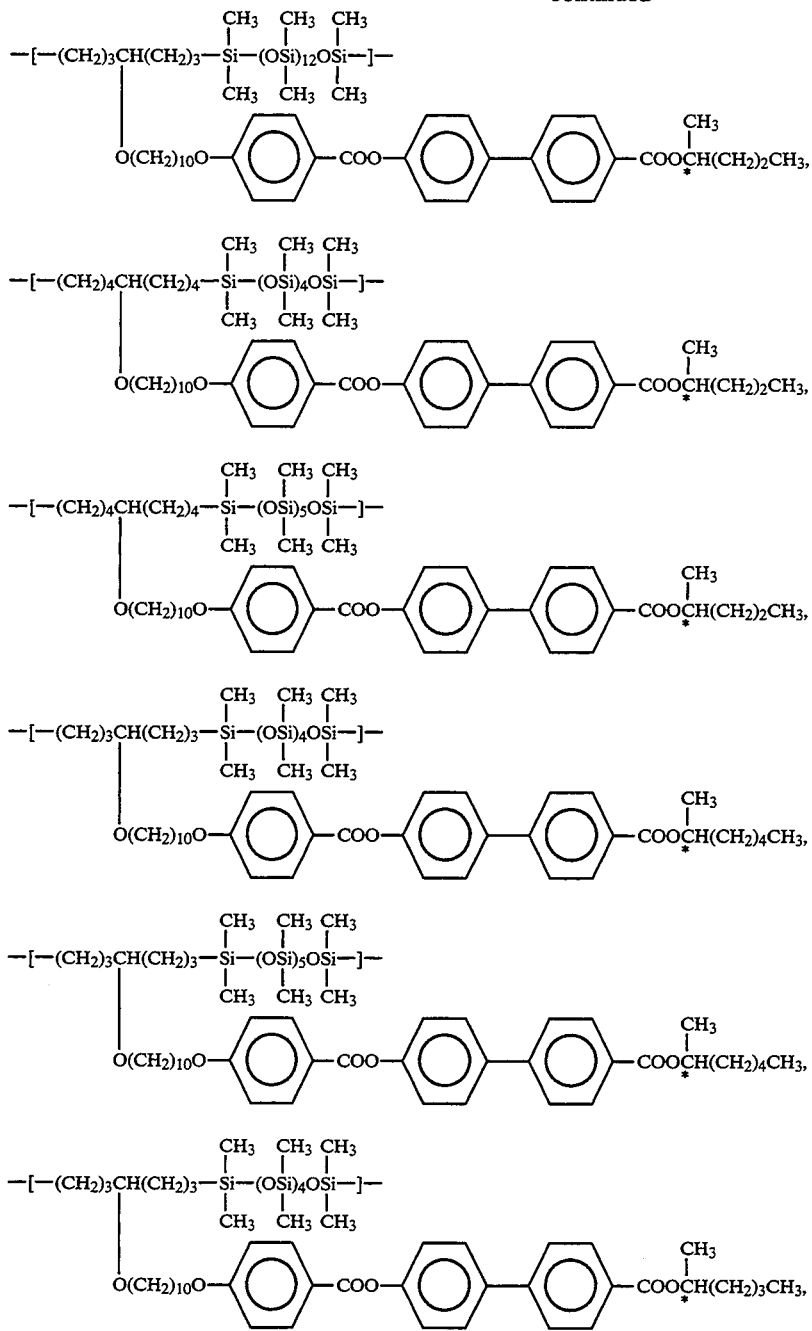
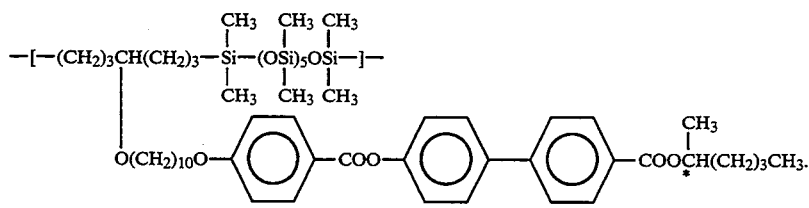
5. The novel high polymer as claimed in claim 4 comprising a recurring unit represented by the formula:

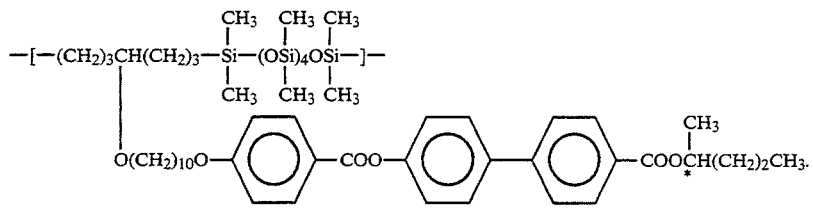

6. The novel high polymer as claimed in claim 4 comprising a recurring unit represented by the formula:

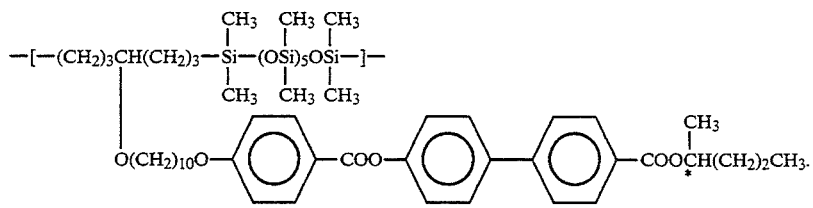

7. The novel high polymer as claimed in claim 4 comprising a recurring unit represented by the formula:

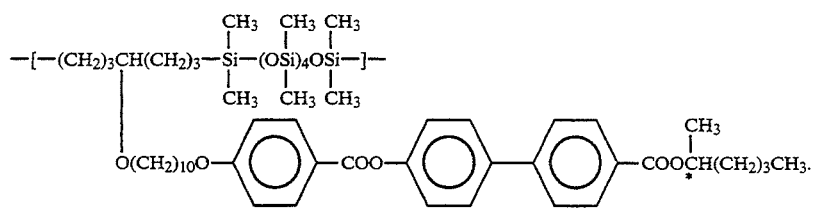

8. The novel high polymer as claimed in claim 4 comprising a recurring unit represented by the formula:

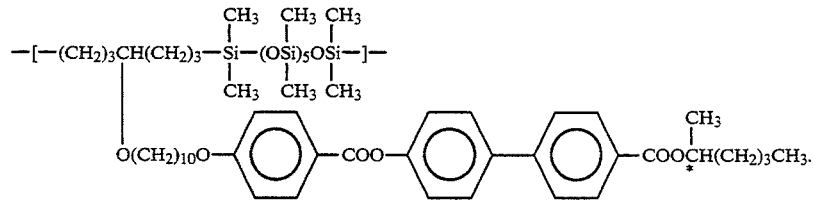

9. A ferroelectric liquid crystal composition comprising the high polymer as claimed in claim 1 and a low molecular weight smectic liquid crystal.

10. The ferroelectric liquid crystal composition as claimed in claim 9, wherein the ferroelectric liquid crystal composition contains 5 to 99% by weight of the high polymer based on the total of the high polymer and the low molecular weight smectic liquid crystal.

11. The ferroelectric liquid crystal composition as claimed in claim 9, wherein the low molecular weight smectic liquid crystal is selected from the group consisting of

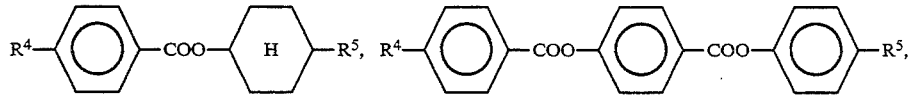

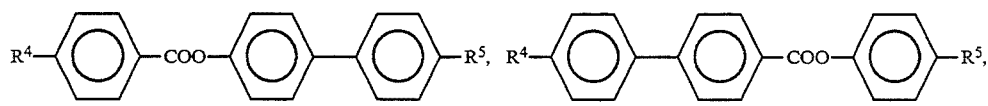

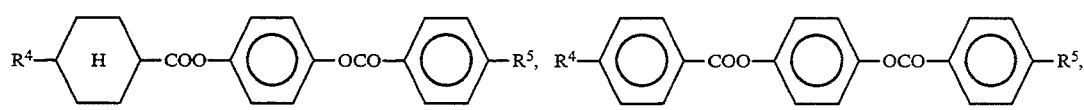

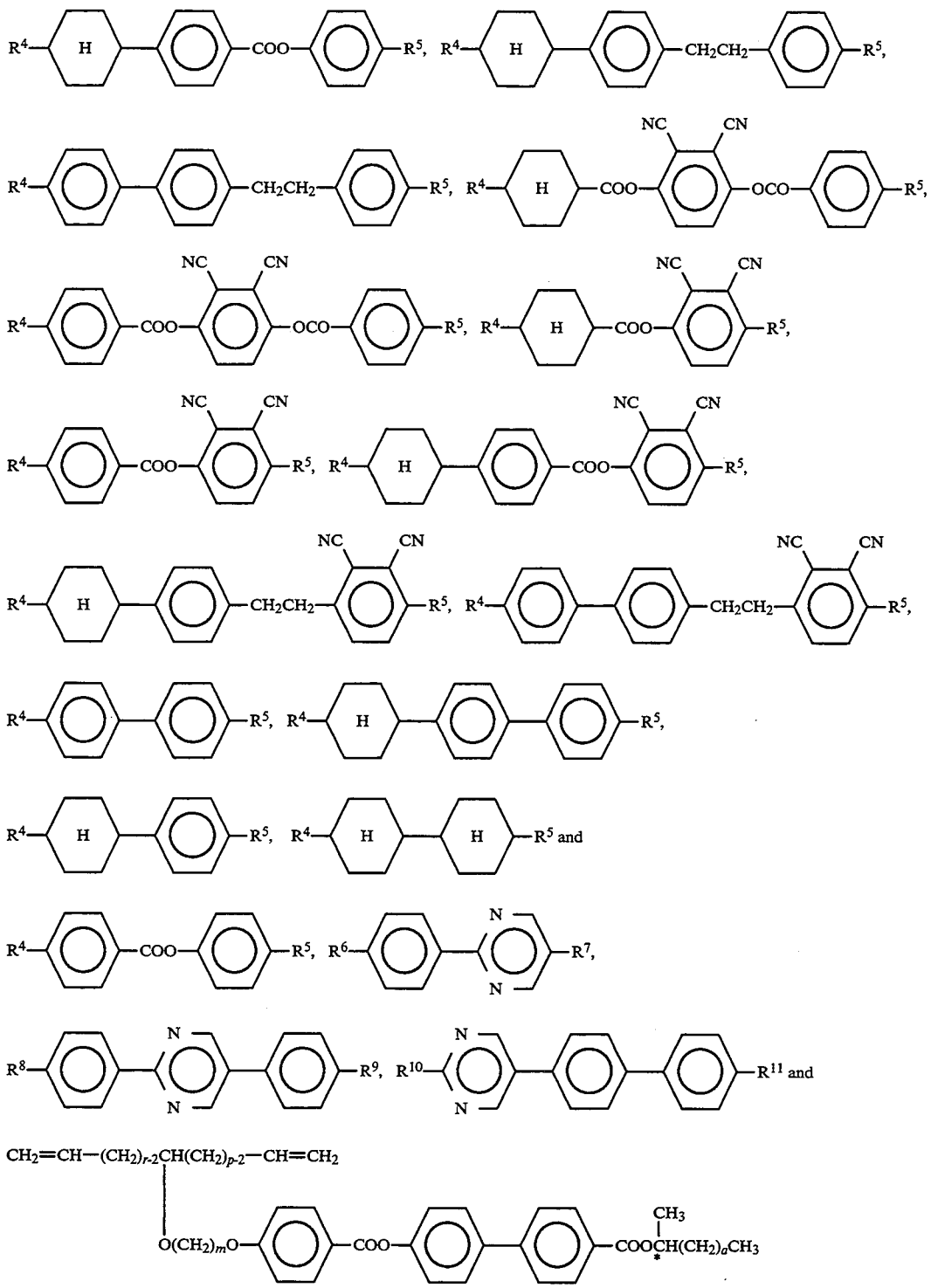

wherein r and p each represent an integer of 2 to 5, m represents an integer of 8 to 12, a represents an integer of 1 to 8, and * represents an asymmetric carbon, $R^4$ and $R^5$ each represent an alkyl of 1 to 12 carbon atoms, an alkoxy of 1 to 12 carbon atoms or an acyloxy of 1 to 12 carbon atoms, and are identical with or different from each other, $R^6$ represents an alkyl of 7 to 12 carbon atoms, an alkoxy of 6 to 11 carbon atoms or an acyloxy of 6 to 12 carbon atoms, $R^7$ represents an alkyl of 7 to 12 carbon atoms or an alkoxy of 6 to 11 carbon atoms, $R^8$ and $R^9$ each represent an alkyl of 4 to 14 carbon atoms or an alkoxy of 4 to 14 carbon atoms, and are identical with or different from each other, $R^{10}$ represents an alkyl of 4 to 14 carbon atoms, and $R^{11}$ represents an alkyl of 5 to 14 carbon atoms or an alkoxy of 4 to 14 carbon atoms.

12. The ferroelectric liquid crystal composition as claimed in claim 11, wherein the low molecular weight smectic liquid crystal is selected from the group consisting of

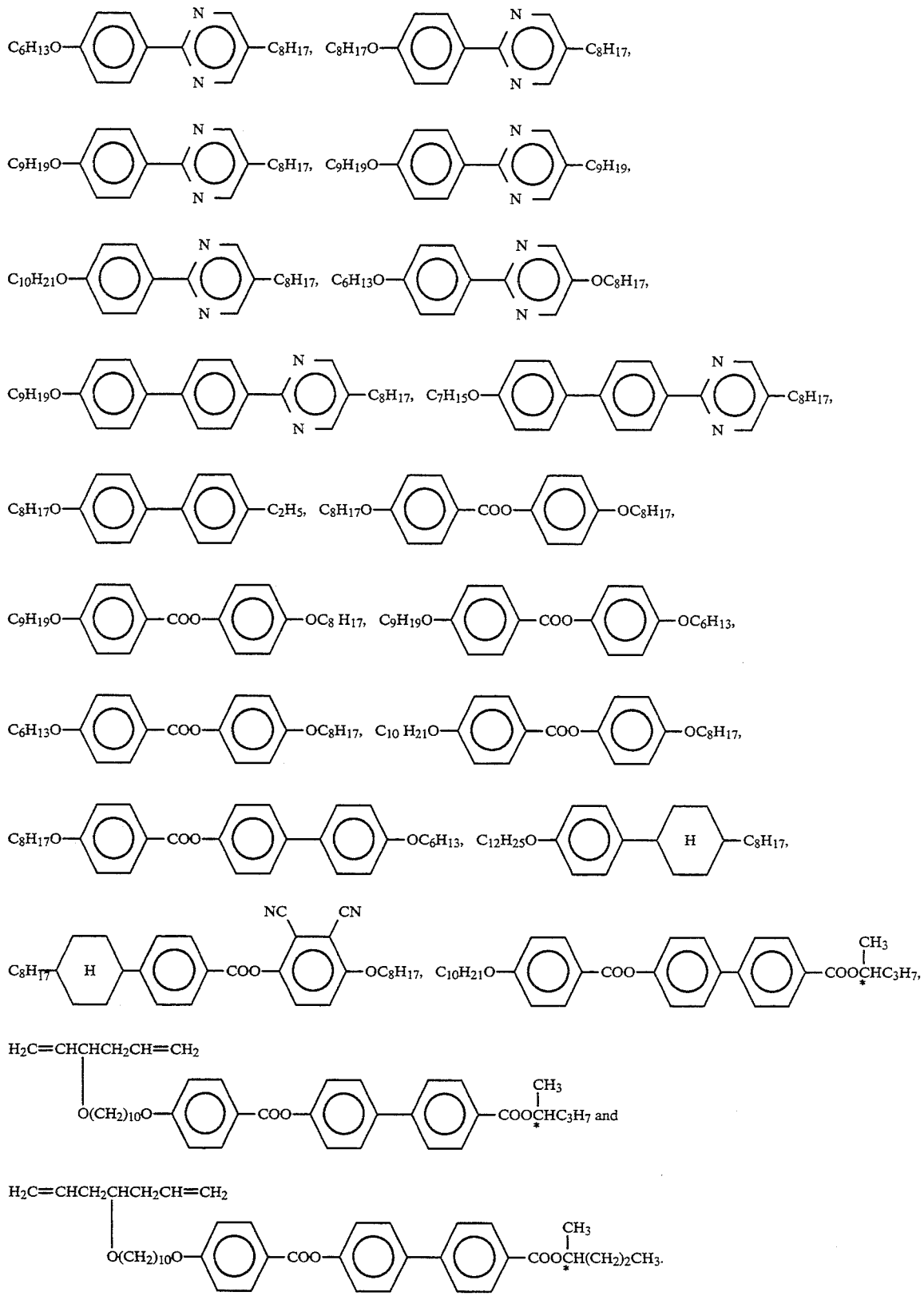
13. The ferroelectric liquid crystal composition as claimed in claim 12, wherein the low molecular weight smectic liquid crystal is selected from the group consisting of

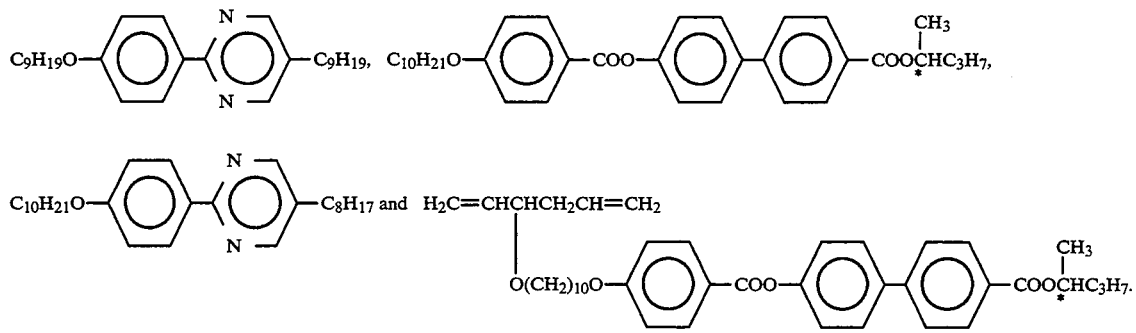

14. The ferroelectric liquid crystal composition as claimed in claim 9, wherein the low molecular weight smectic liquid crystal is a ferroelectric liquid crystal.

15. The ferroelectric liquid crystal composition as claimed in claim 9, wherein the high polymer and the low molecular weight smectic liquid crystal are compatible with each other and are present in the ferroelectric liquid crystal composition in a state of a uniform mixture.

16. The ferroelectric liquid crystal composition as claimed in claim 9, wherein the high polymer has a weight average molecular weight of 1,000 to 1,000,000.

17. The ferroelectric liquid crystal composition as claimed in claim 16, wherein r represents an integer of 2 to 4, p represents an integer of 3 or 4, q represents a number of 4 to 12, m represents an integer of 10, and a represents an integer of 2 to 4.

18. The ferroelectric liquid crystal composition as claimed in claim 17, wherein the recurring units of the high polymer are selected from the group consisting of

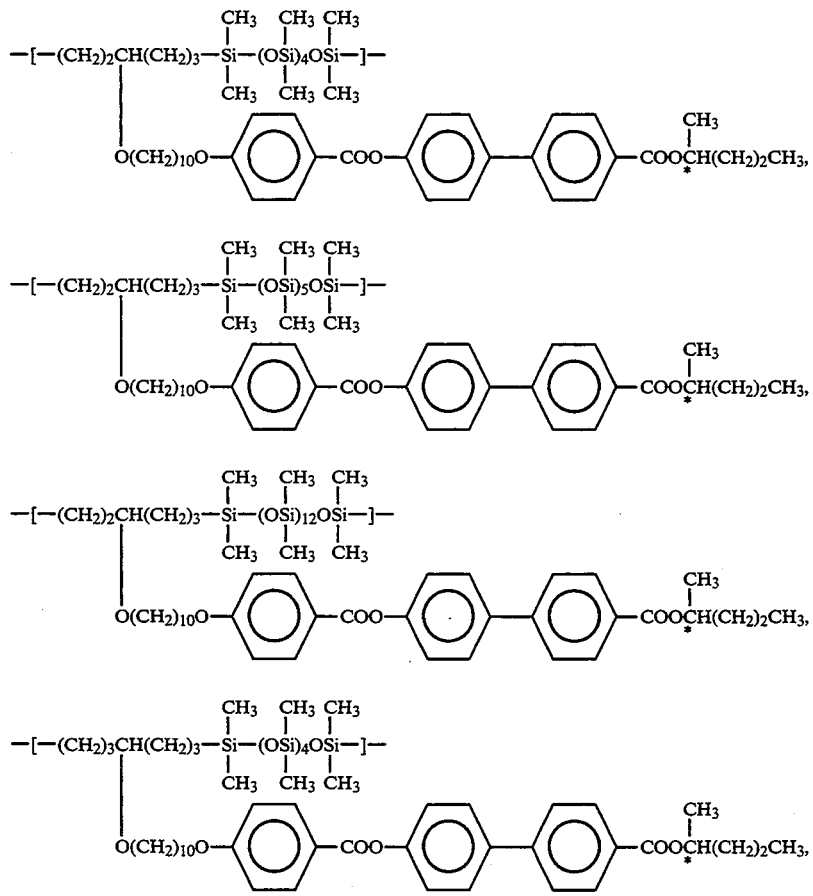

-continued
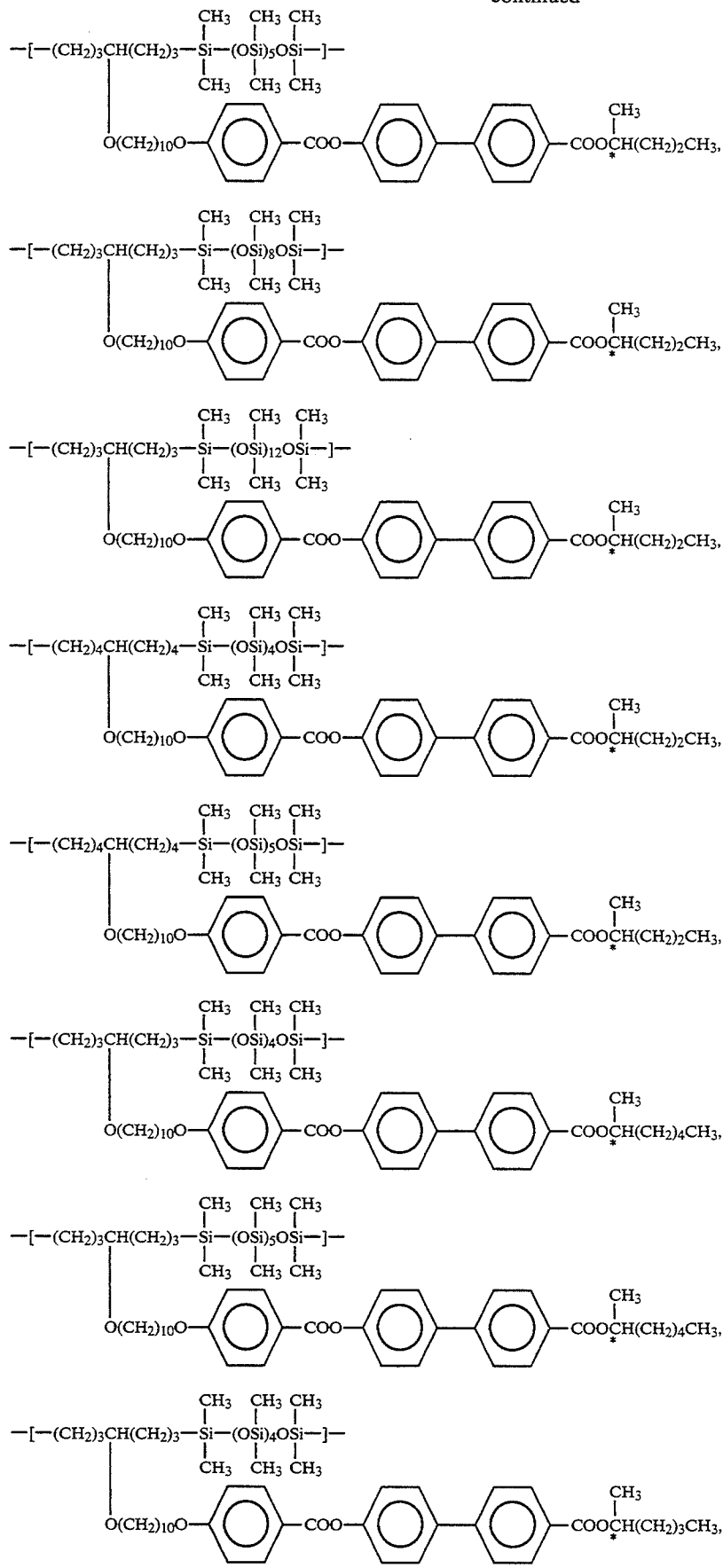

and

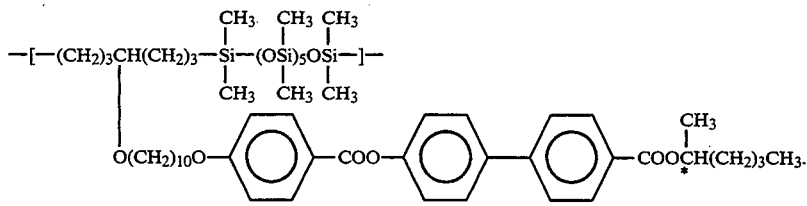

19. The ferroelectric liquid crystal composition as claimed in claim 18, wherein the ferroelectric liquid crystal composition contains 5 to 99% by weight of the high polymer based on the total of the high polymer and the low molecular weight smectic liquid crystal, and the low molecular weight smectic liquid crystal is selected from the group consisting of

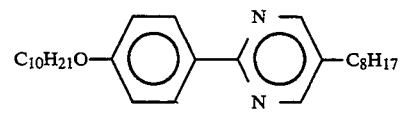

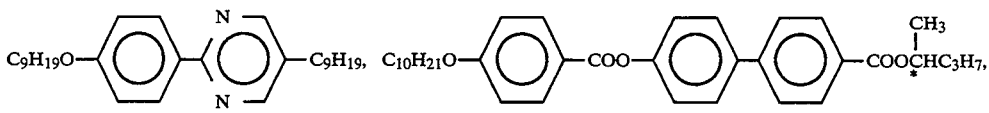

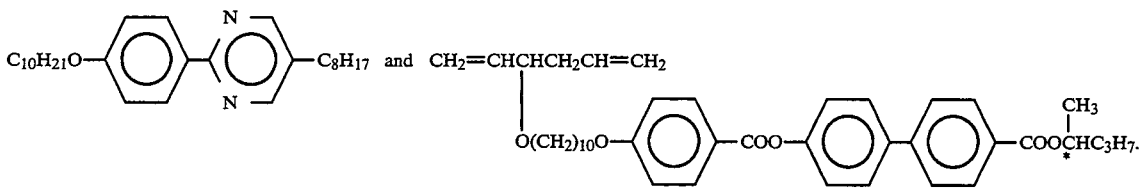

20. The ferroelectric liquid crystal composition as claimed in claim 19, comprising a high polymer comprising a recurring unit represented by the formula:

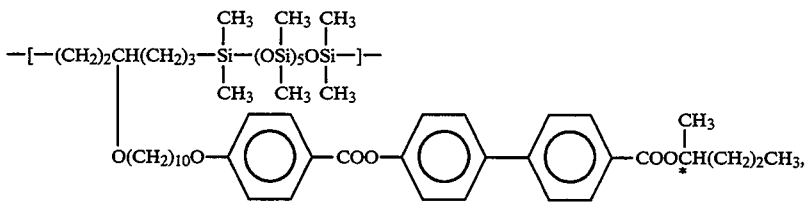

a low molecular weight smectic liquid crystal represented by the formula:

and a low molecular weight smectic liquid crystal represented by the formula:

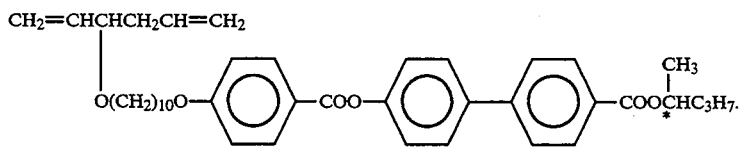

21. The ferroelectric liquid crystal composition as claimed in claim 19, comprising a novel high polymer comprising a recurring unit represented by the formula:

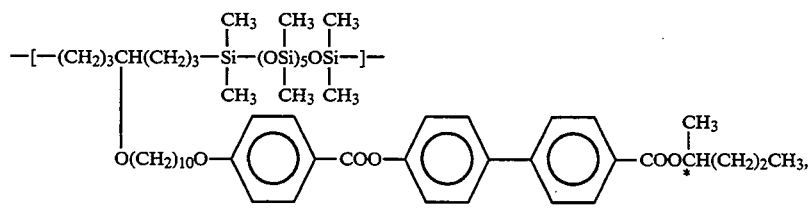

a low molecular weight smectic liquid crystal represented by the formula:
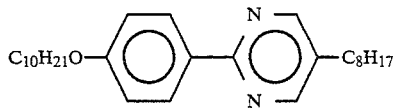
and a low molecular weight smectic liquid crystal represented by the formula:
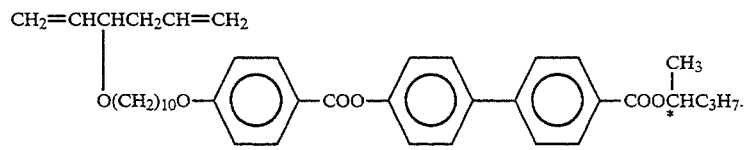
* * * * *